(12) United States Patent
Muralidharan et al.

(10) Patent No.: US 11,866,809 B2
(45) Date of Patent: Jan. 9, 2024

(54) CREEP AND CORROSION-RESISTANT CAST ALUMINA-FORMING ALLOYS FOR HIGH TEMPERATURE SERVICE IN INDUSTRIAL AND PETROCHEMICAL APPLICATIONS

(71) Applicant: UT-BATTELLE, LLC, Oak Ridge, TN (US)

(72) Inventors: Govindarajan Muralidharan, Knoxville, TN (US); Michael P. Brady, Oak Ridge, TN (US); Yukinori Yamamoto, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 328 days.

(21) Appl. No.: 17/162,917

(22) Filed: Jan. 29, 2021

(65) Prior Publication Data
US 2022/0251690 A1 Aug. 11, 2022

(51) Int. Cl.
*C22C 30/00* (2006.01)
*C22C 19/05* (2006.01)
*B32B 9/00* (2006.01)

(52) U.S. Cl.
CPC ............... *C22C 30/00* (2013.01); *B32B 9/00* (2013.01); *C22C 19/055* (2013.01); *B32B 2315/02* (2013.01)

(58) Field of Classification Search
None
See application file for complete search history.

(56) References Cited

U.S. PATENT DOCUMENTS

| | | |
|---|---|---|
| 3,754,898 A | 8/1973 | McGurty |
| 3,826,689 A | 7/1974 | Ohta et al. |
| 3,839,022 A | 10/1974 | Webster et al. |
| 3,865,581 A | 2/1975 | Sekino et al. |
| 3,865,644 A | 2/1975 | Hellner et al. |
| 3,989,514 A | 11/1976 | Fujioka et al. |
| 4,086,085 A | 4/1978 | McGurty |
| 4,204,862 A | 5/1980 | Kado et al. |
| 4,359,350 A | 11/1982 | Laidler et al. |
| 4,385,934 A | 5/1983 | McGurty |
| 4,530,720 A | 7/1985 | Moroishi et al. |
| 4,560,408 A | 12/1985 | Wilhelmsson |

(Continued)

OTHER PUBLICATIONS

Yamamoto, et al., "Alumina-Forming Austenitic Stainless Steels Strengthened by Laves Phase and MC Carbide Precipitates," Metallurgical and Materials Transactions A, 2007.

(Continued)

*Primary Examiner* — Elizabeth Collister
(74) *Attorney, Agent, or Firm* — FOX ROTHSCHILD LLP

(57) ABSTRACT

An austenitic Ni-base alloy, consisting essentially of, in weight percent: 2.5 to 4.75 Al; 21 to 26 Cr; 20 to 40 Fe; 0.75 to 2.5 total of at least one element elected from the group consisting of Nb and Ta; 0 to 0.25 Ti; 0.09 to 1.5 Si; 0 to 0.5 V; 0 to 2 Mn; 0 to 3 Cu; 0 to 2 of at least one element selected from the group consisting of Mo and W; 0 to 1 of at least one element selected from the group consisting of Zr and Hf; 0 to 0.15 Y; 0.3 to 0.55 C; 0.005 to 0.1 B; 0 to 0.05 P; less than 0.06 N and balance Ni (30 to 46 Ni), wherein the weight percent Ni is greater than the weight percent Fe, and wherein the ratio Ni/(Fe+2*C) is between 1.02 and 1.067.

18 Claims, 30 Drawing Sheets

(56) References Cited

U.S. PATENT DOCUMENTS

| | | |
|---|---|---|
| 4,572,738 A | 2/1986 | Korenko et al. |
| 4,576,653 A | 3/1986 | Ray |
| 4,767,597 A | 8/1988 | Nishino et al. |
| 4,818,485 A | 4/1989 | Maziasz et al. |
| 4,822,695 A | 4/1989 | Larson et al. |
| 4,849,169 A | 7/1989 | Maziasz et al. |
| 5,130,085 A | 7/1992 | Tendo et al. |
| 5,217,684 A | 6/1993 | Igarashi et al. |
| 5,480,283 A | 1/1996 | Doi et al. |
| 5,501,834 A | 3/1996 | Nakasuji et al. |
| 5,556,594 A | 9/1996 | Frank et al. |
| 5,603,891 A | 2/1997 | Brill |
| 5,618,491 A | 4/1997 | Kurup et al. |
| 5,945,067 A | 8/1999 | Hibner et al. |
| 6,004,408 A | 12/1999 | Montagnon |
| 6,193,145 B1 | 2/2001 | Fournier et al. |
| 6,352,670 B1 | 3/2002 | Rakowski |
| 6,372,181 B1 | 4/2002 | Fahrmann et al. |
| 6,447,716 B1 | 9/2002 | Cozar et al. |
| 6,866,816 B2 | 3/2005 | Liang et al. |
| 7,744,813 B2 | 6/2010 | Brady et al. |
| 7,754,144 B2 | 7/2010 | Brady et al. |
| 7,754,305 B2 | 7/2010 | Yamamoto et al. |
| 8,431,072 B2 | 4/2013 | Muralidharan et al. |
| 8,815,146 B2 | 8/2014 | Yamamoto et al. |
| 9,249,482 B2 | 2/2016 | Jakobi et al. |
| 10,053,756 B2 | 8/2018 | Jakobi et al. |
| 10,174,408 B2 | 1/2019 | Muralidharan et al. |
| 10,207,242 B2 | 2/2019 | Chun et al. |
| 2004/0060622 A1 | 4/2004 | Lilley |
| 2004/0191109 A1 | 9/2004 | Maziasz et al. |
| 2005/0129567 A1 | 6/2005 | Kirchheiner et al. |
| 2007/0086910 A1 | 4/2007 | Liang |
| 2007/0217941 A1 | 9/2007 | Hayashi et al. |
| 2008/0292489 A1 | 11/2008 | Yamamoto et al. |
| 2011/0250463 A1 | 10/2011 | Helander et al. |
| 2012/0301347 A1 | 11/2012 | Muralidharan et al. |
| 2013/0126056 A1 | 5/2013 | Feng et al. |
| 2014/0205802 A1* | 7/2014 | Enjo ............ C23C 8/14 428/141 |
| 2016/0167009 A1 | 6/2016 | Chun et al. |
| 2016/0369376 A1 | 12/2016 | Muralidharan et al. |
| 2019/0106770 A1 | 4/2019 | Kirchheiner et al. |
| 2019/0169714 A1 | 6/2019 | Muralidharan et al. |
| 2019/0226065 A1 | 7/2019 | Maziasz et al. |
| 2019/0330723 A1 | 10/2019 | Maziasz et al. |

OTHER PUBLICATIONS

Brady, et al., Effects of Minor Alloy Additions and Oxidation Temperature on Protective Alumina Scale Formation in Creep-Resistant Austenitic Stainless Steels, Scripta Materialia, 2007, pp. 1117-1120, vol. 57.

Asterman et al.: "The Influence of Al Content on the High Temperature Oxidation Properties of State-of-the-Art Cast Ni-base Alloys", Oxid Met (2013) 80:3-12.

International Search Report dated Apr. 12, 2022 in PCT/US22/14315.

International search report dated Apr. 12, 2022 in PCT/US22/14316.

* cited by examiner

CREEP AND CORROSION-RESISTANT CAST ALUMINA-FORMING ALLOYS FOR HIGH TEMPERATURE SERVICE IN INDUSTRIAL AND PETROCHEMICAL APPLICATIONS

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention relates to cast alumina-forming alloys, and more particularly to high temperature creep-resistant and corrosion-resistant alloys.

BACKGROUND OF THE INVENTION

Common austenitic stainless steels contain a maximum by weight percent of 0.15% carbon, a minimum of 16% chromium and sufficient nickel and/or manganese to retain a face centered-cubic (FCC) austenitic crystal structure at cryogenic temperatures through the melting point of the alloy. Austenitic stainless steels are non-magnetic non-heat-treatable steels that are usually annealed and cold worked. Common austenitic stainless steels are widely used in power generating applications; however, they are becoming increasingly less desirable as the industry moves toward higher thermal efficiencies. Higher operating temperatures in power generation result in reduced emissions and increased efficiencies. Conventional austenitic stainless steels currently offer good creep strength and environmental resistance up to 600-700° C. However, in order to meet emission and efficiency goals of the next generation of power plants structural alloys will be needed to increase operating temperatures by 50-100° C.

Austenitic stainless steels for high temperature use rely on chromium-oxide (chromia, $Cr_2O_3$) scales for oxidation protection. These scales grow relatively quickly. However, compromised oxidation resistance of chromia in the presence of aggressive species such as water vapor, carbon, sulfur, and the like typically encountered in energy production and process environments necessitates a reduction in operating temperature to achieve component durability targets. This temperature reduction reduces process efficiency and increases environmental emissions.

High nickel austenitic stainless steels and nickel based superalloys can meet the required property targets, but their costs for construction of power plants are prohibitive due to the high cost of nickel. Creep failure of common austenitic stainless steels such as types 316, 321, and 347 has limited the use of these.

A new class of austenitic stainless steels has been recently developed to be more oxidation resistant at higher temperature—these are the alumina-forming austenitic (AFA) stainless steels. These alloys are described in Yamamoto et al. U.S. Pat. No. 7,754,305, Brady et al U.S. Pat. No. 7,744,813, and Brady et al U.S. Pat. No. 7,754,144, Muralidharan U.S. Pat. No. 8,431,072, and Yamamoto U.S. Pat. No. 8,815,146, the disclosures of which are hereby incorporated fully by reference.

Alumina-forming austenitic (AFA) stainless steels are a new class of high-temperature (600-900° C.; 1112-1652° F.) structural alloy steels with a wide range of energy production, chemical/petrochemical, and process industry applications. These steels combine the relatively low cost, excellent formability, weldability, and good high-temperature creep strength (resistance to sagging over time) of state-of-the-art advanced austenitic stainless steels with fundamentally superior high-temperature oxidation (corrosion) resistance due to their ability to form protective aluminum oxide (alumina, $Al_2O_3$) surface layers.

Alumina grows at a rate 1 to 2 orders of magnitude lower than chromia and is also significantly more thermodynamically stable in oxygen, which results in its fundamentally superior high-temperature oxidation resistance. A further, key advantage of alumina over chromia is its greater stability in the presence of water vapor. Water vapor is encountered in most high-temperature industrial environments, ranging, for example, from gas turbines, combustion, and fossil-fired steam plants to solid oxide fuel cells. With both oxygen and water vapor present, volatile chromium oxyhydroxide species can form and significantly reduce oxidation lifetime, necessitating significantly lower operating temperatures. This results in reduced process efficiency and increased emissions.

To date AFA alloy development has focused on wrought material forms (plate, sheet, foil, and tubes). However, many applications require complicated component shapes best achieved by casting (engine and turbine components). Casting can also result in lower cost tube production methods for chemical/petrochemical and power generation applications.

Other applications may demand cast alloys for use in the temperature range up to about 900° C. in applications such as furnace tubes, furnace rolls, and petrochemical applications. One example of this class of materials is Cast HP-Nb type alloy of the composition. These alloys contain about 35 wt. % Ni and about 25 wt. % Cr, 1 wt. % Nb, 1 wt. % Si, with up to ~0.45 wt. % carbon. These obtain their creep resistance through the formation of carbides. They also obtain their oxidation resistance through the formation of chromia scales. Another common alloy consists of 45 wt. % Ni and about 35 wt. % Cr with about 1 wt. % Nb, 1 wt. % Si, and 0.45 wt. % C and is widely used in the petrochemical industry.

SUMMARY OF THE INVENTION

An austenitic Ni-base alloy according to the invention can comprise, consist essentially of, or consist of, in weight percent:
2.5 to 4.75 Al;
21 to 26 Cr;
20 to 40 Fe;
0.75 to 2.5 total of at least one element selected from the group consisting of Nb and Ta;
0 to 0.25 Ti;
0.09 to 1.5 Si;
0 to 0.5 V;
0 to 2 Mn;
0 to 3 Cu;
0 to 2 of at least one element selected from the group consisting of Mo and W;
0 to 1 of at least one element selected from the group consisting of Zr and Hf;
0 to 0.15 Y;
0.3 to 0.55 C;
0.005 to 0.1 B;
0 to 0.05 P;

less than 0.06 N; and balance Ni (30 to 46 Ni). The weight percent Ni is greater than the weight percent Fe. The ratio Ni/(Fe+2*C) is between 0.95 and 1.0735. The alloy forms an external continuous scale comprising alumina, and has a stable phase FCC austenitic matrix microstructure. The austenitic matrix is essentially delta-ferrite-free and essentially BCC-phase free. The austenitic matrix consists of one or more carbide strengthening phases, and exhibits a creep rupture lifetime of at least 100 h at 900° C. and 50 MPa.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
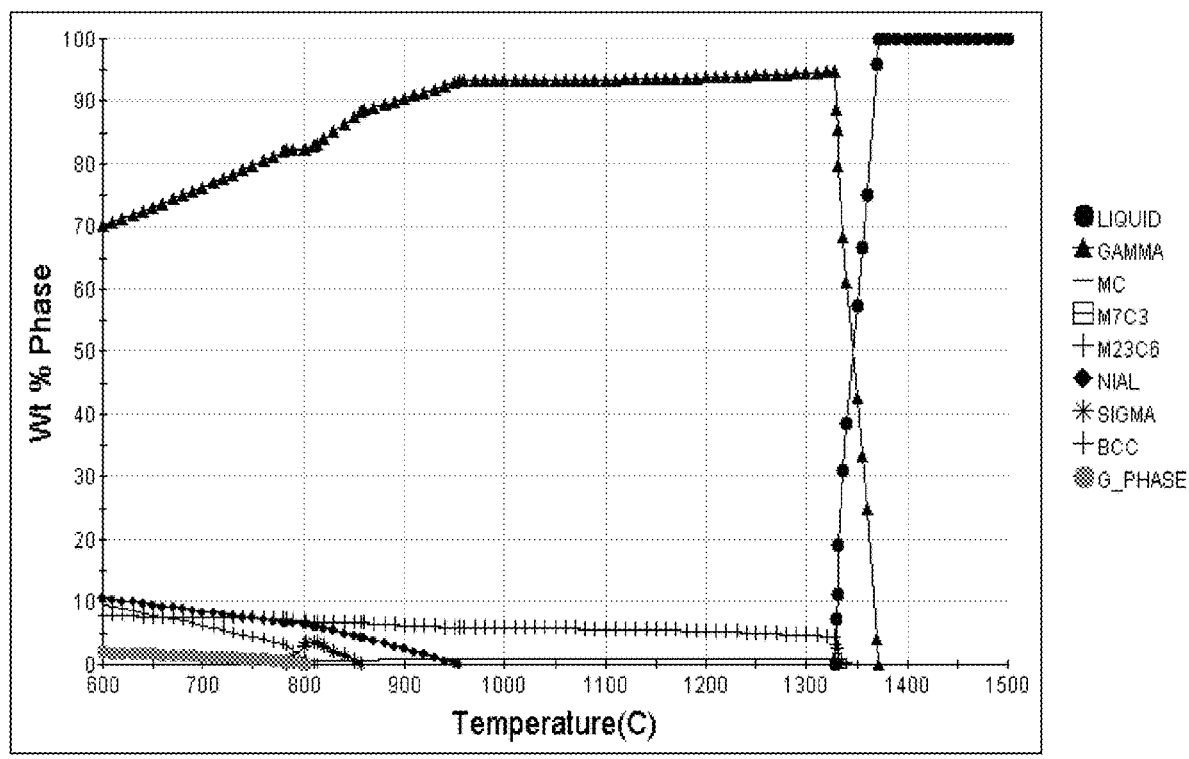
FIG. 1 is a calculated equilibrium phase diagram for alloy 11-1.
Figure 2:
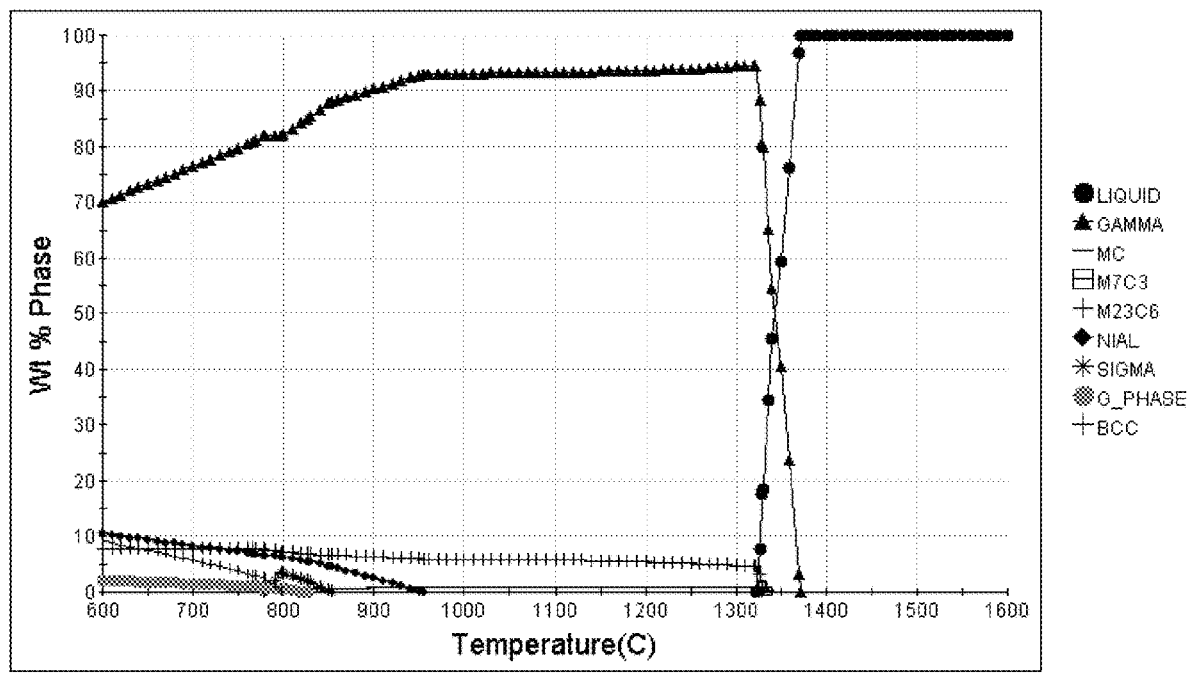
FIG. 2 is a calculated equilibrium phase diagram for alloy 11-2.
Figure 3:
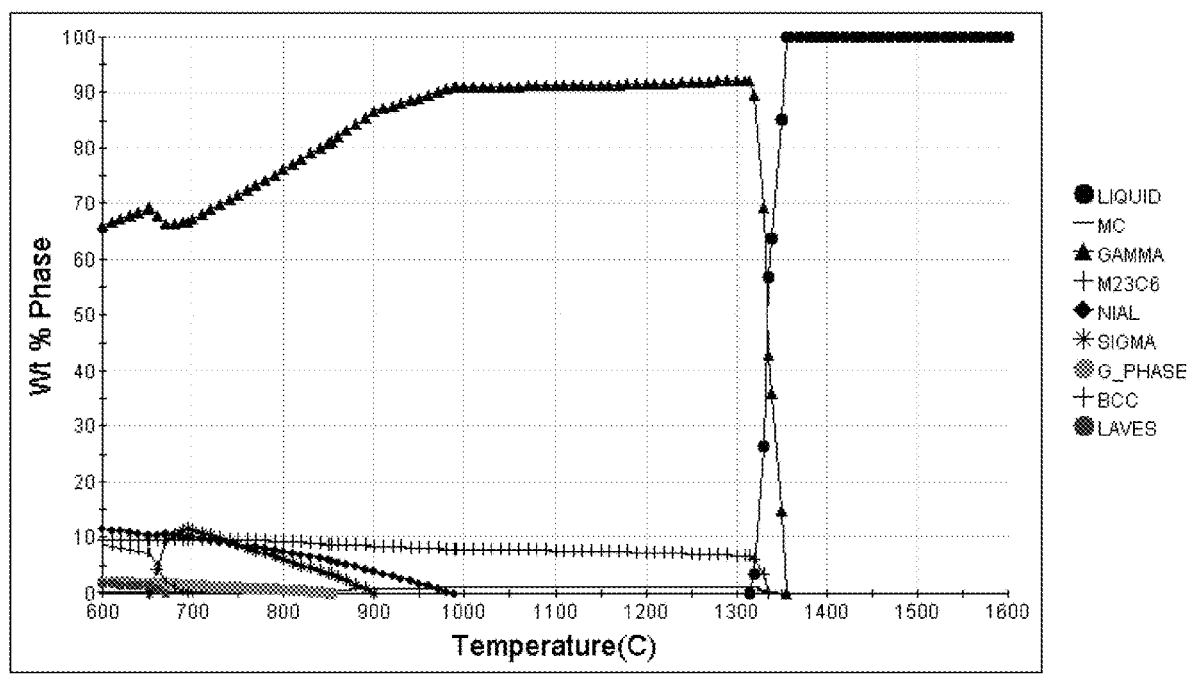
FIG. 3 is a calculated equilibrium phase diagram for alloy 11-3.
Figure 4:
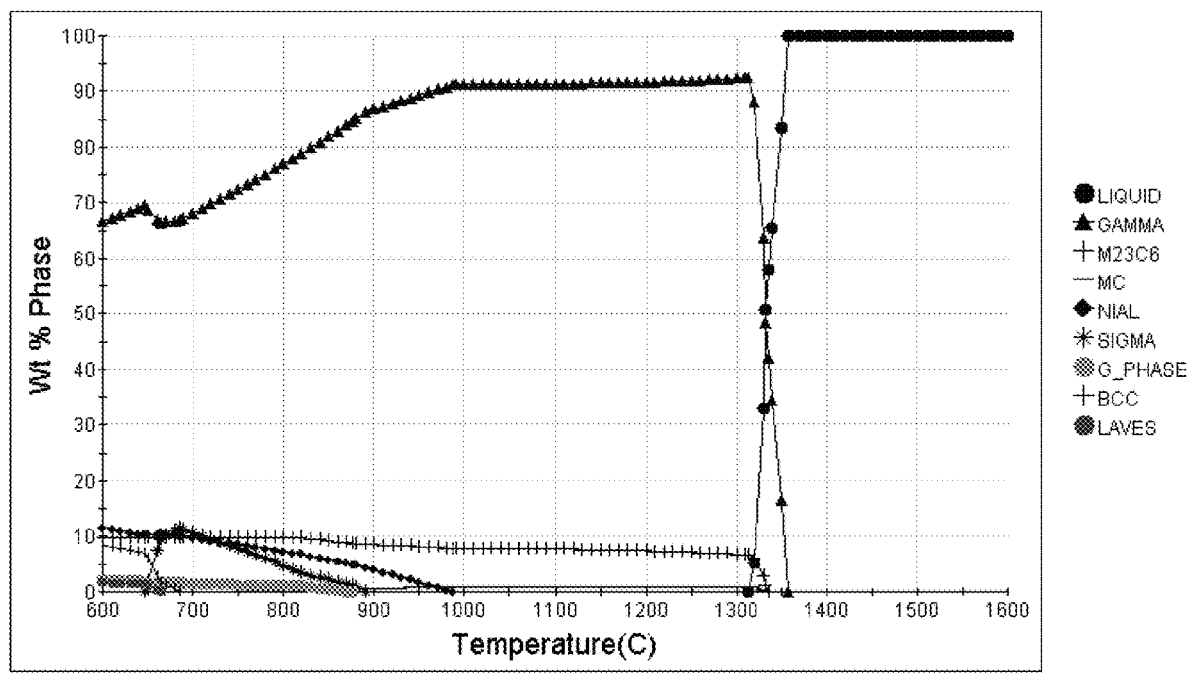
FIG. 4 is a calculated equilibrium phase diagram for alloy 11-4.
Figure 5:
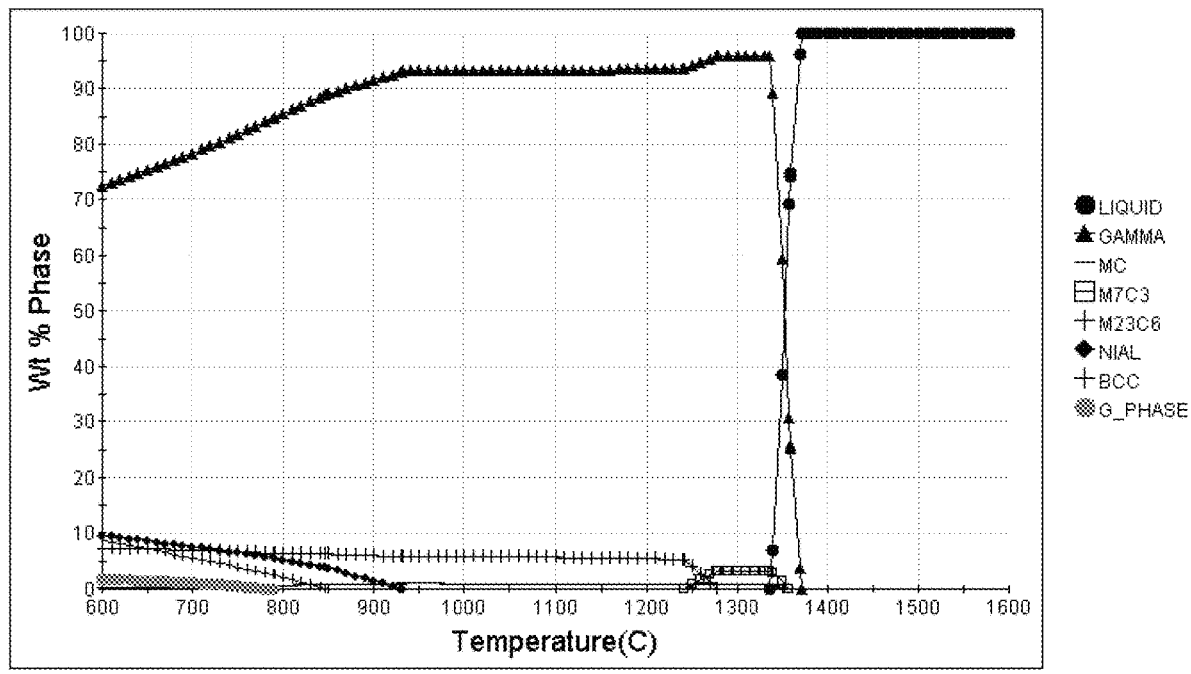
FIG. 5 is a calculated equilibrium phase diagram for alloy 11-5.
Figure 6:
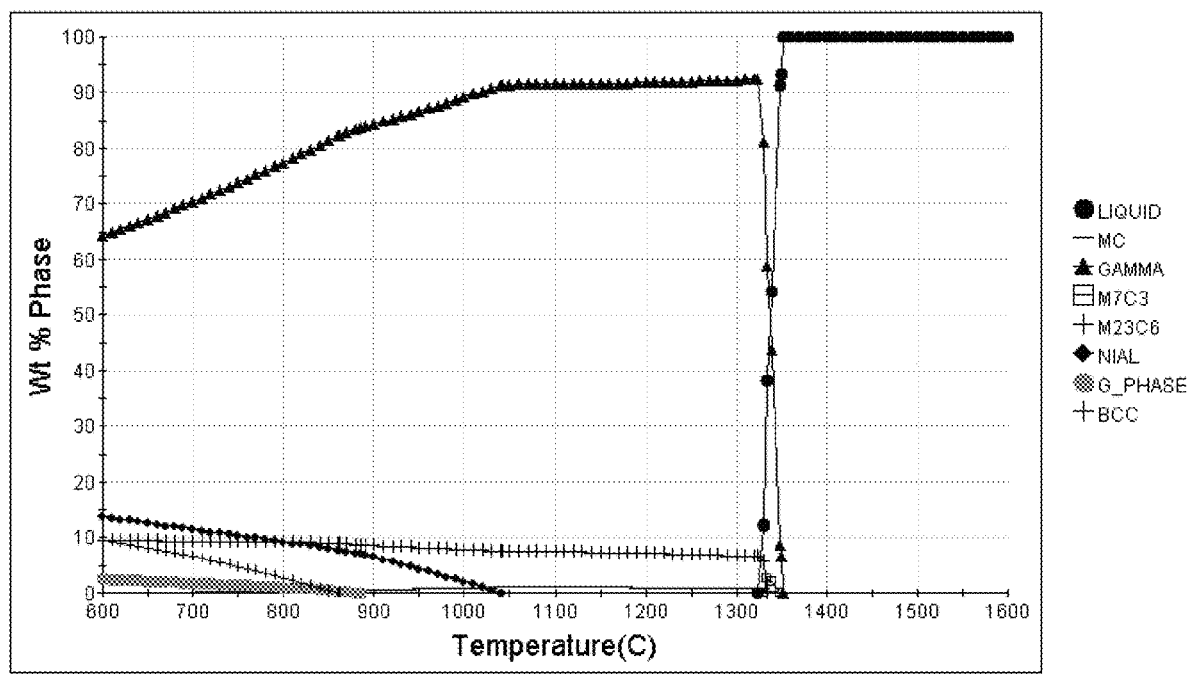
FIG. 6 is a calculated equilibrium phase diagram for alloy 11-6.
Figure 7:
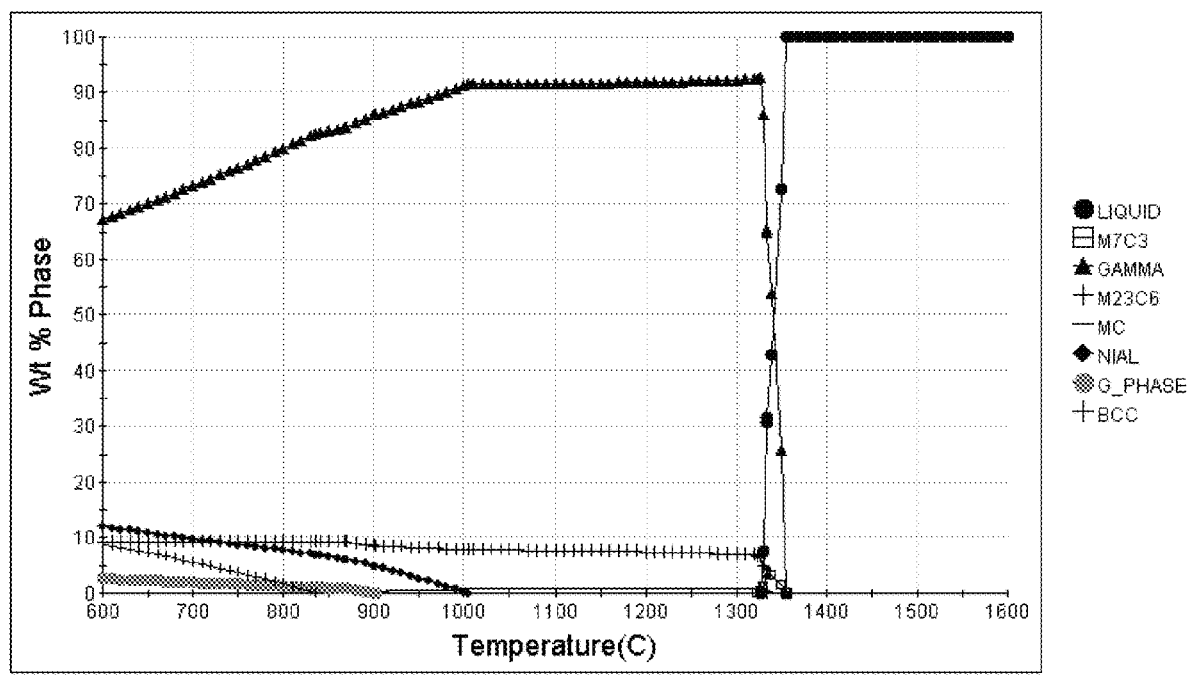
FIG. 7 is a calculated equilibrium phase diagram for alloy 11-7.
Figure 8:
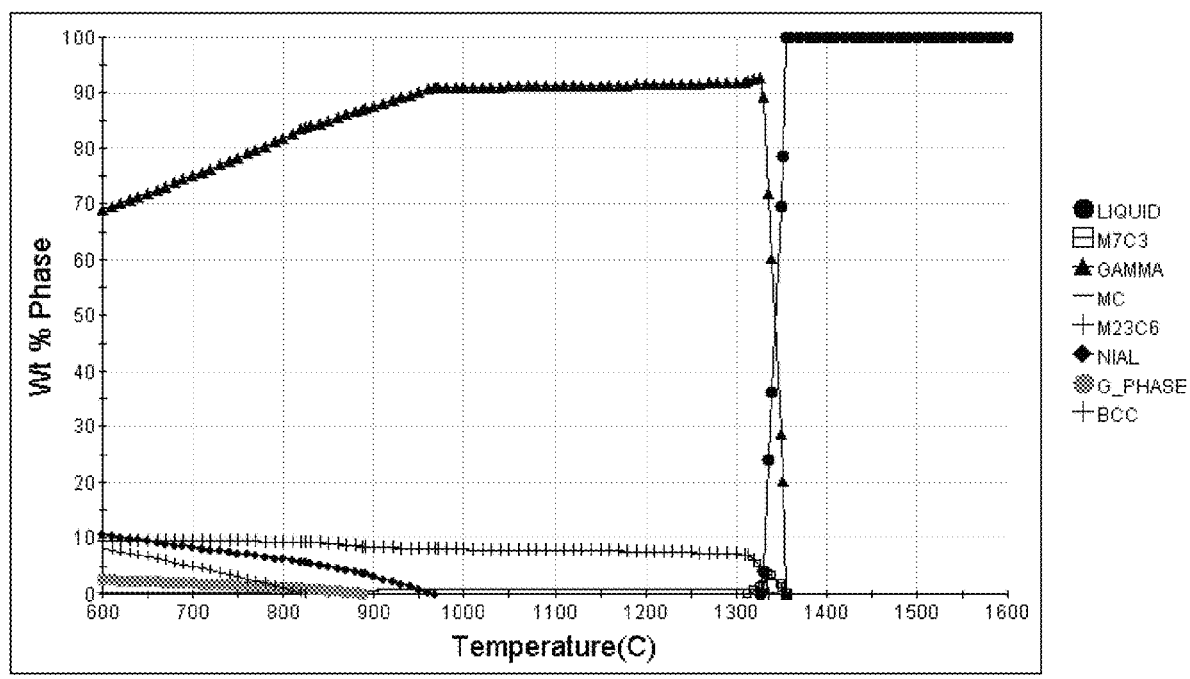
FIG. 8 is a calculated equilibrium phase diagram for alloy 11-8.
Figure 9:
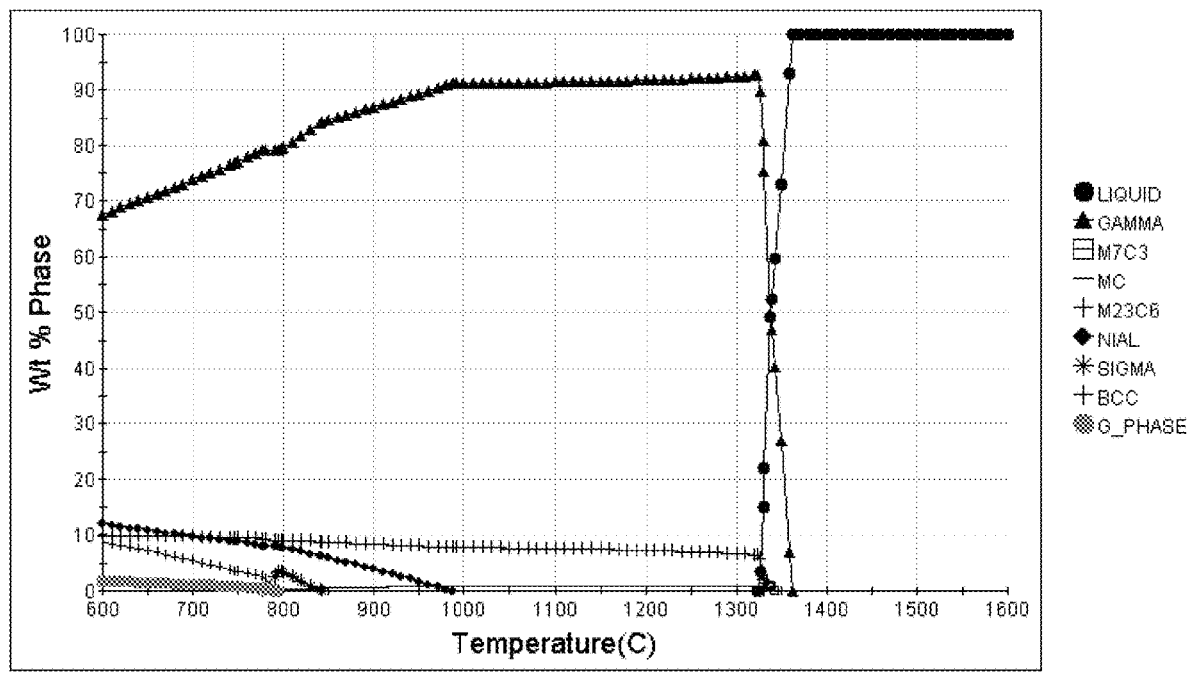
FIG. 9 is a calculated equilibrium phase diagram for alloy 11-9.
Figure 10:
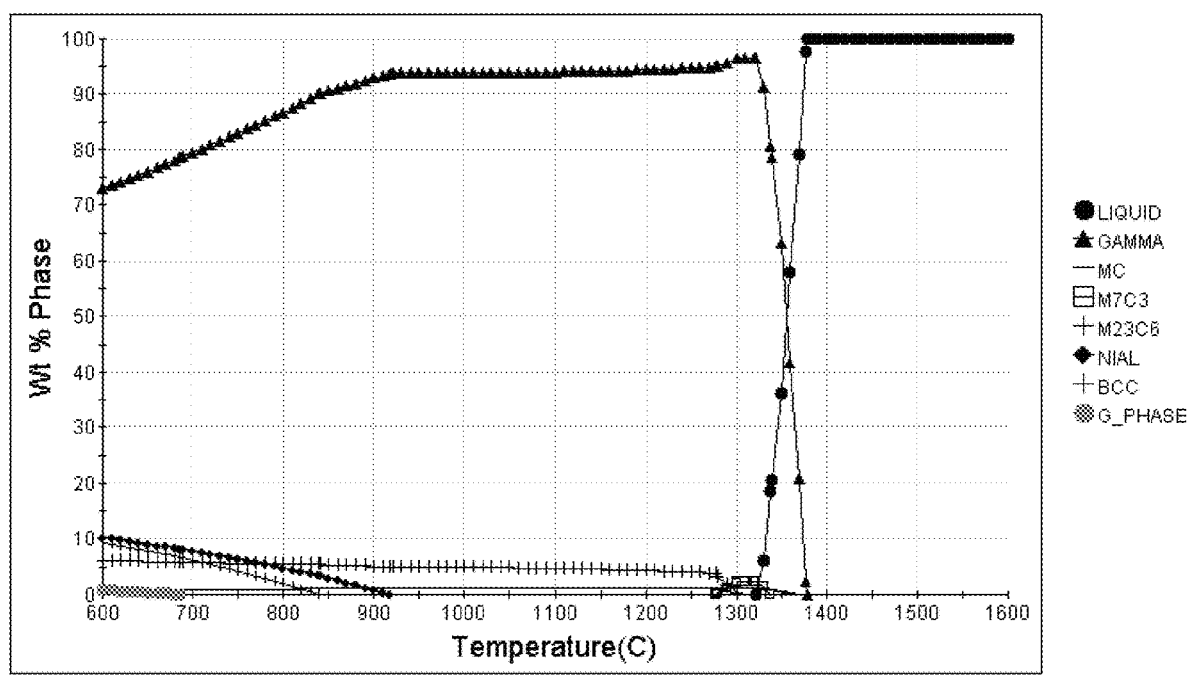
FIG. 10 is calculated equilibrium phase diagram for alloy 11-10.
Figure 11:
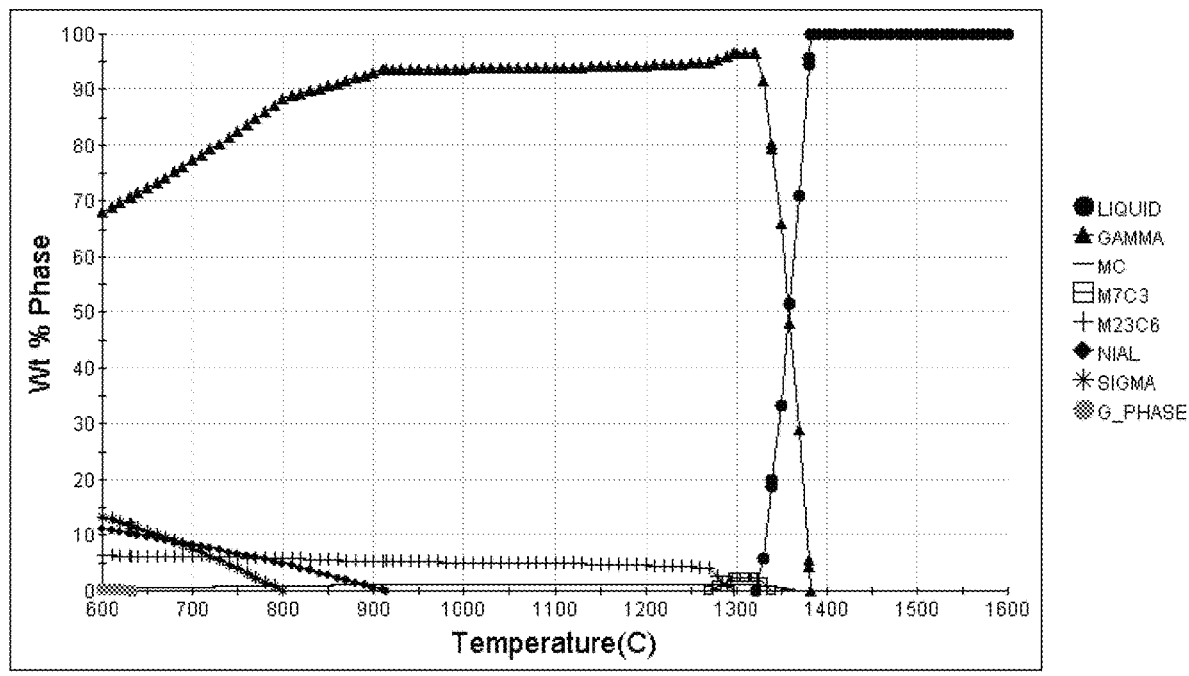
FIG. 11 is a calculated equilibrium phase diagram for alloy 11-11.
Figure 12:
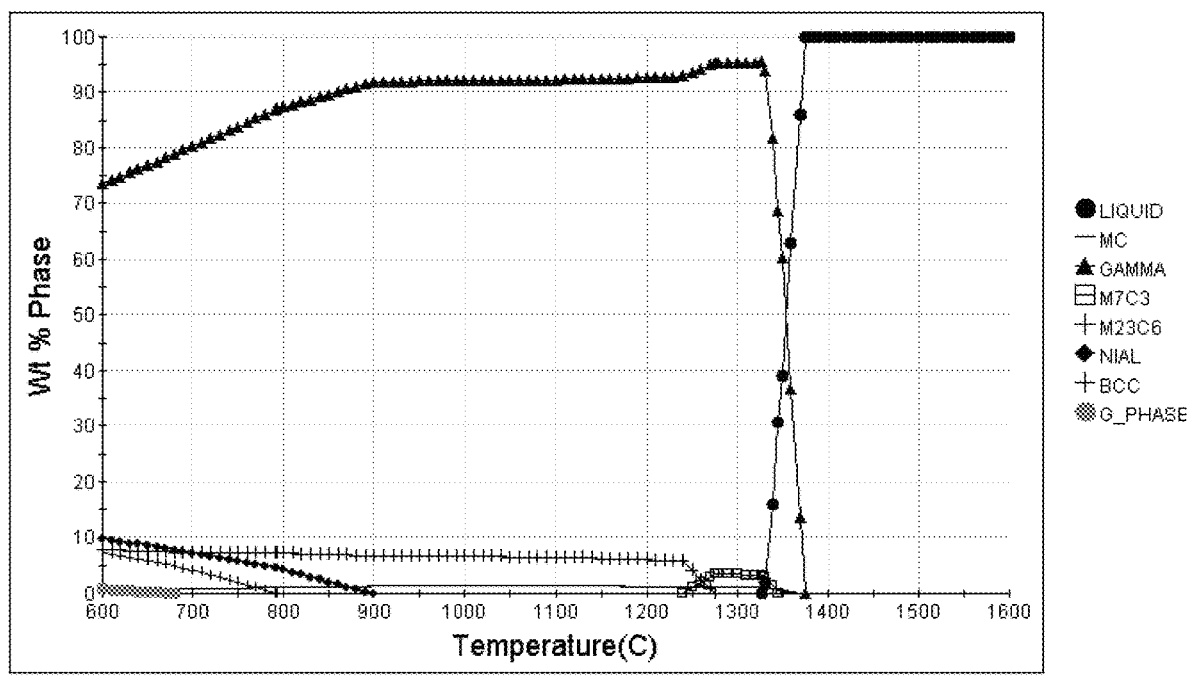
FIG. 12 is a calculated equilibrium phase diagram for alloy 11-12.
Figure 13:
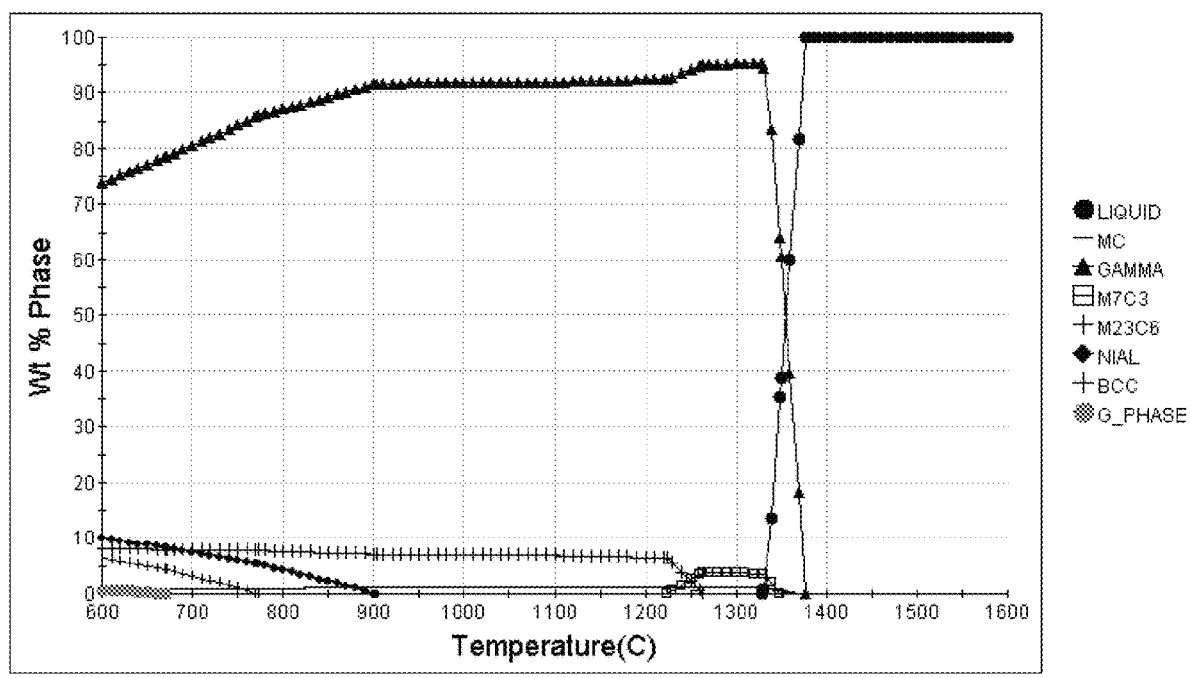
FIG. 13 is a calculated equilibrium phase diagram for alloy 11-13.
Figure 14:
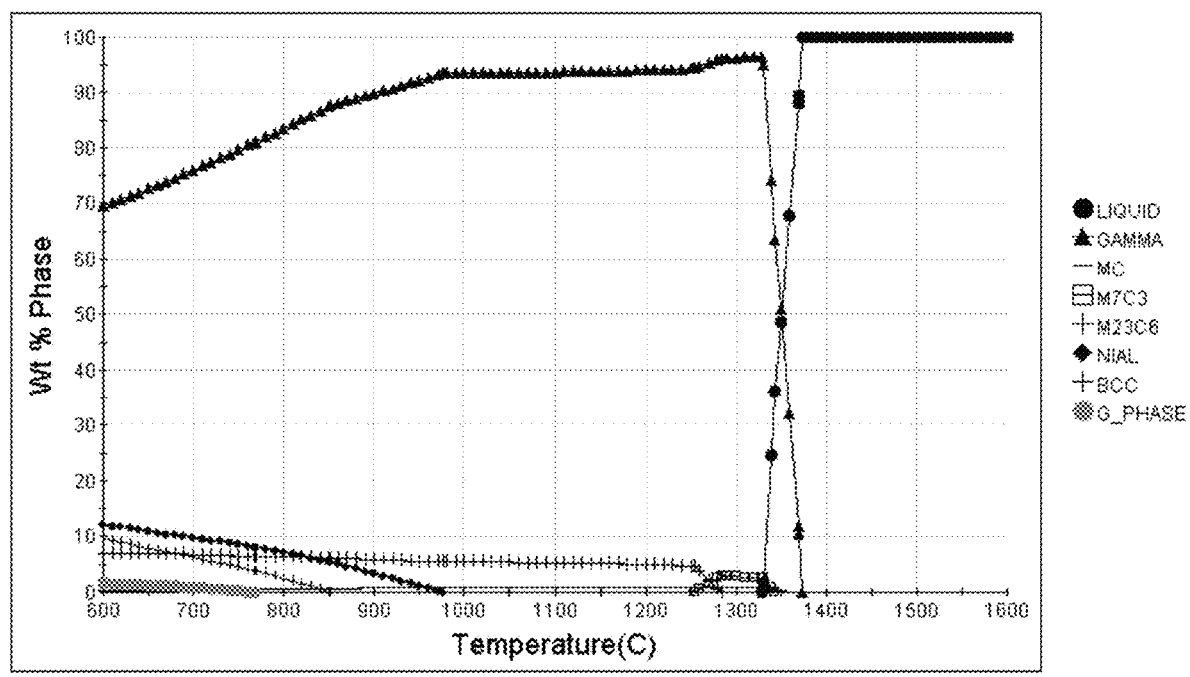
FIG. 14 is a calculated equilibrium phase diagram for alloy 11-14.
Figure 15:
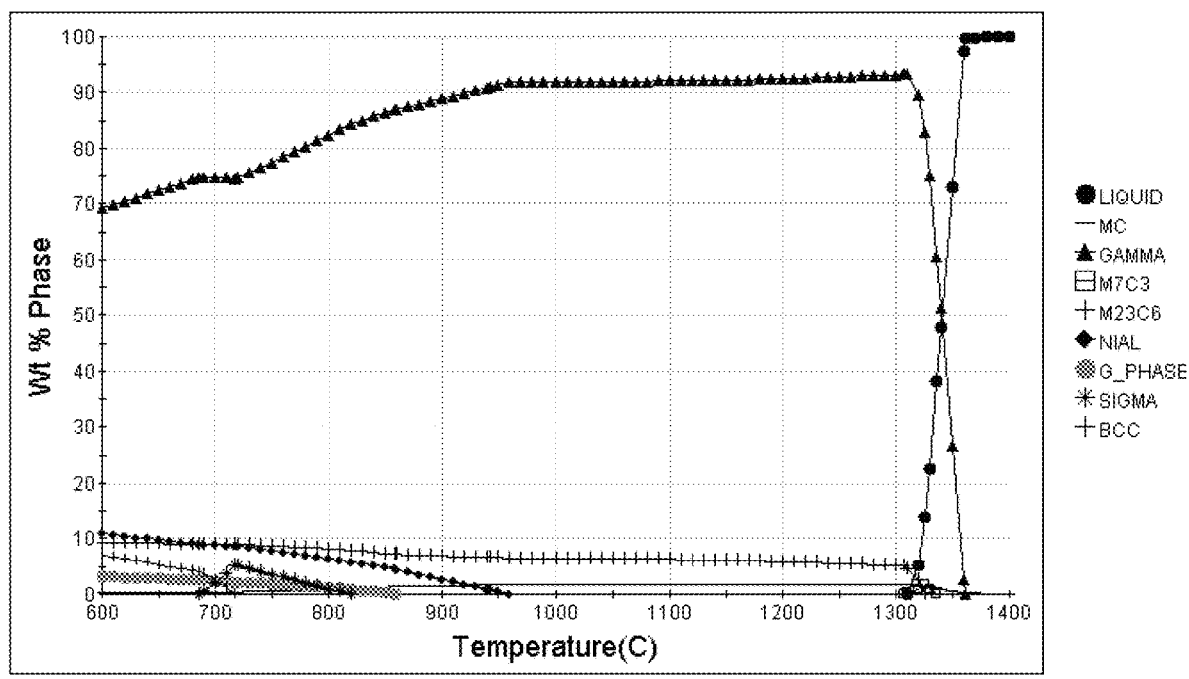
FIG. 15 is a calculated equilibrium phase diagram for alloy 11-15.
Figure 16:
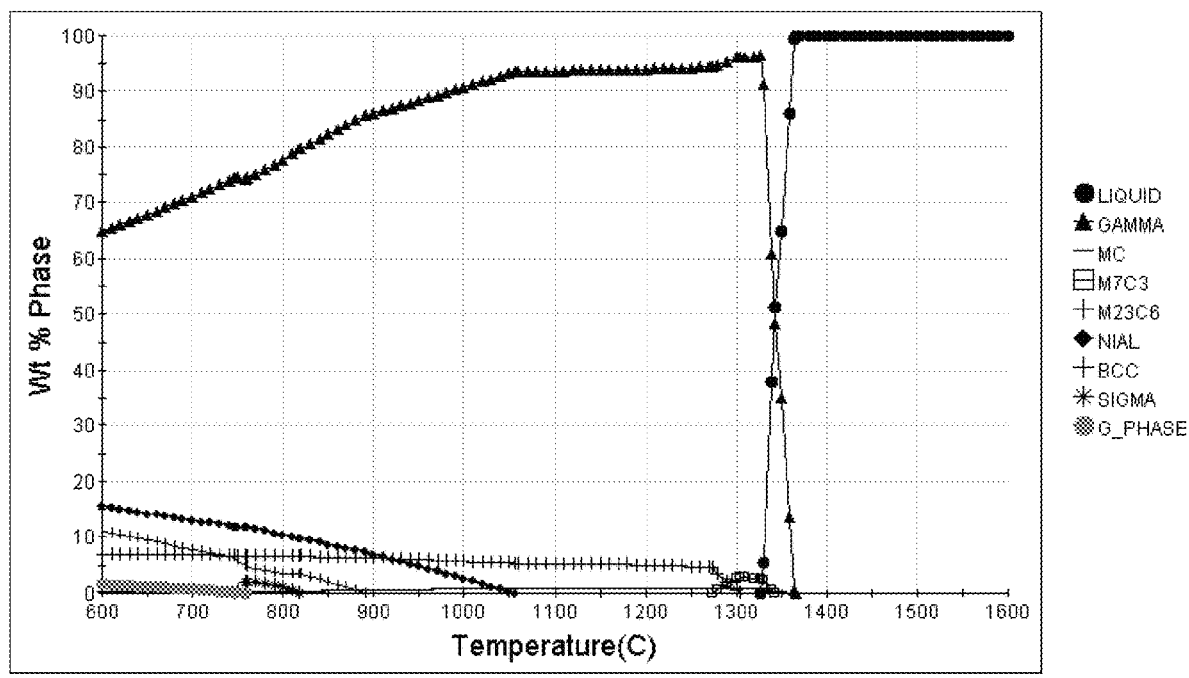
FIG. 16 is a calculated equilibrium phase diagram for alloy 11-16.
Figure 17:
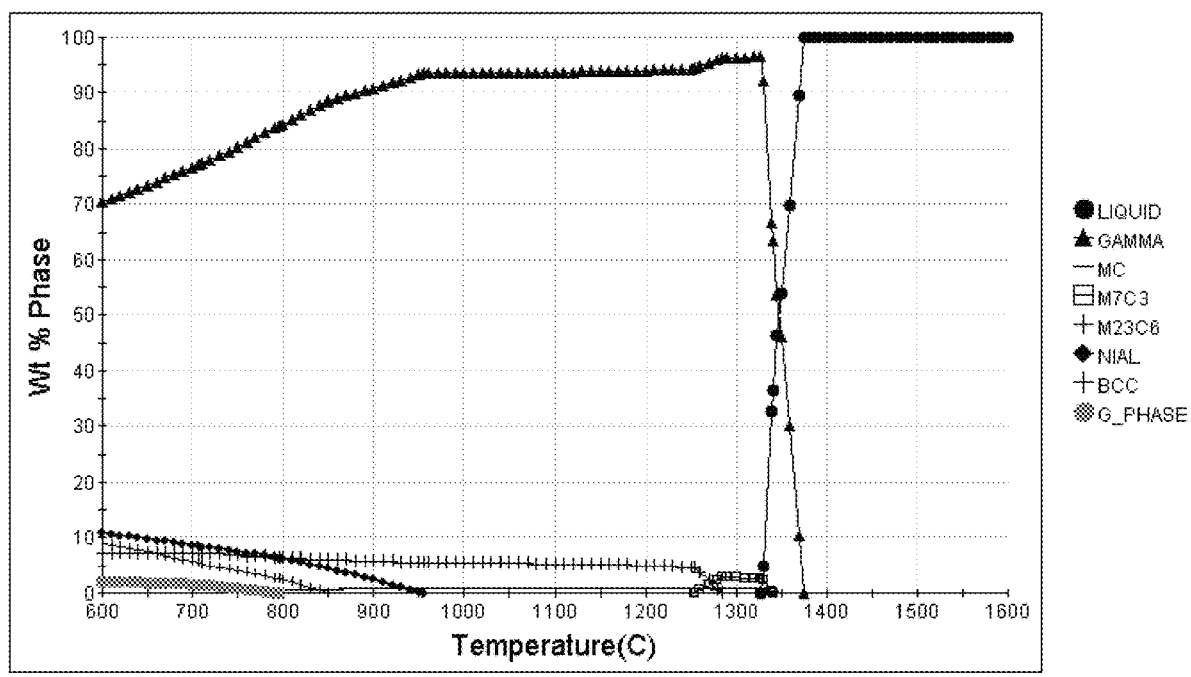
FIG. 17 is a calculated equilibrium phase diagram for alloy 11-17.
Figure 18:
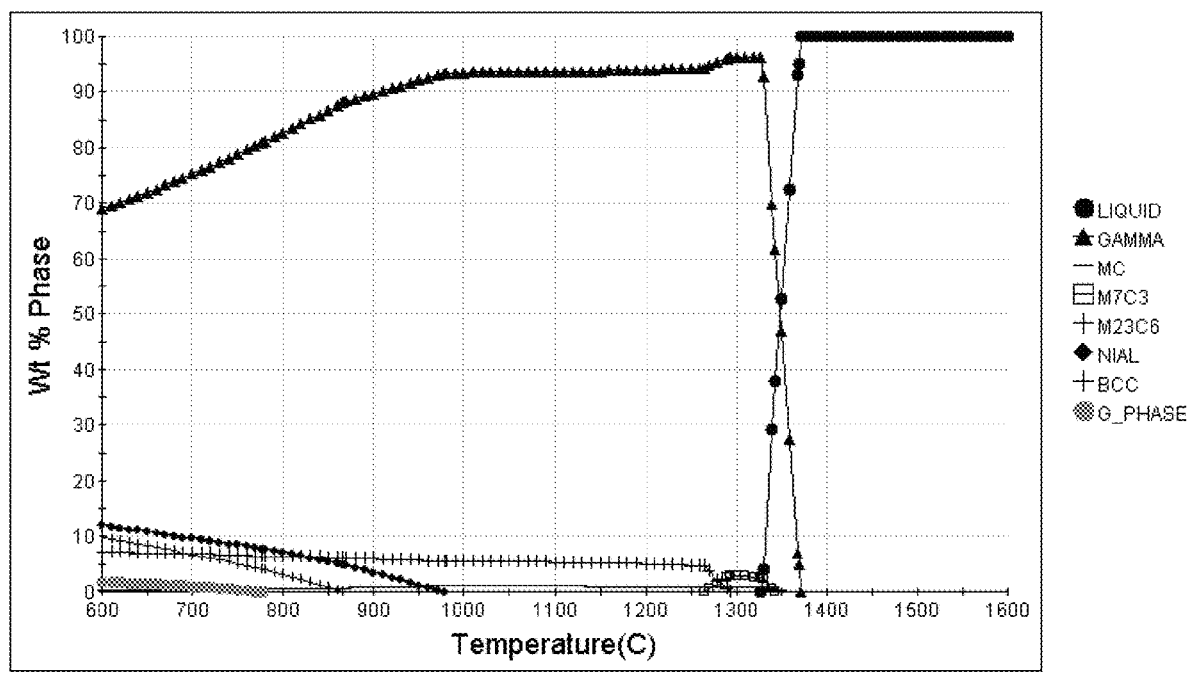
FIG. 18 is a calculated equilibrium phase diagram for alloy 11-18.
Figure 19:
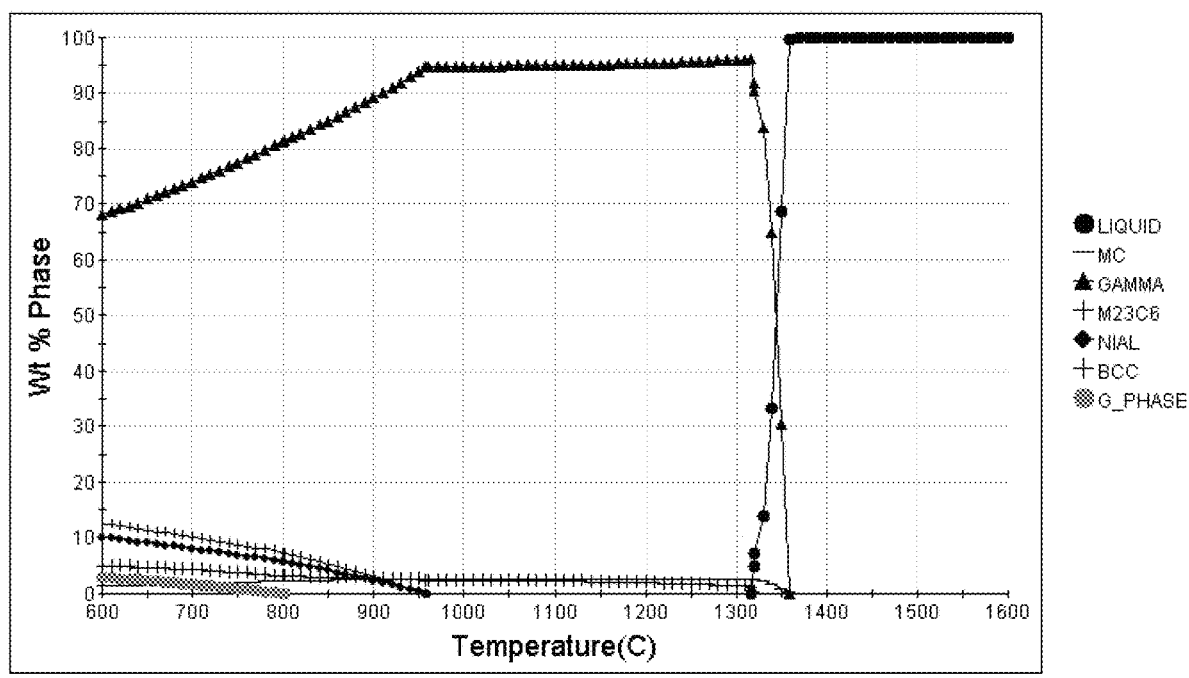
FIG. 19 is a calculated equilibrium phase diagram for alloy 11-19.
Figure 20:
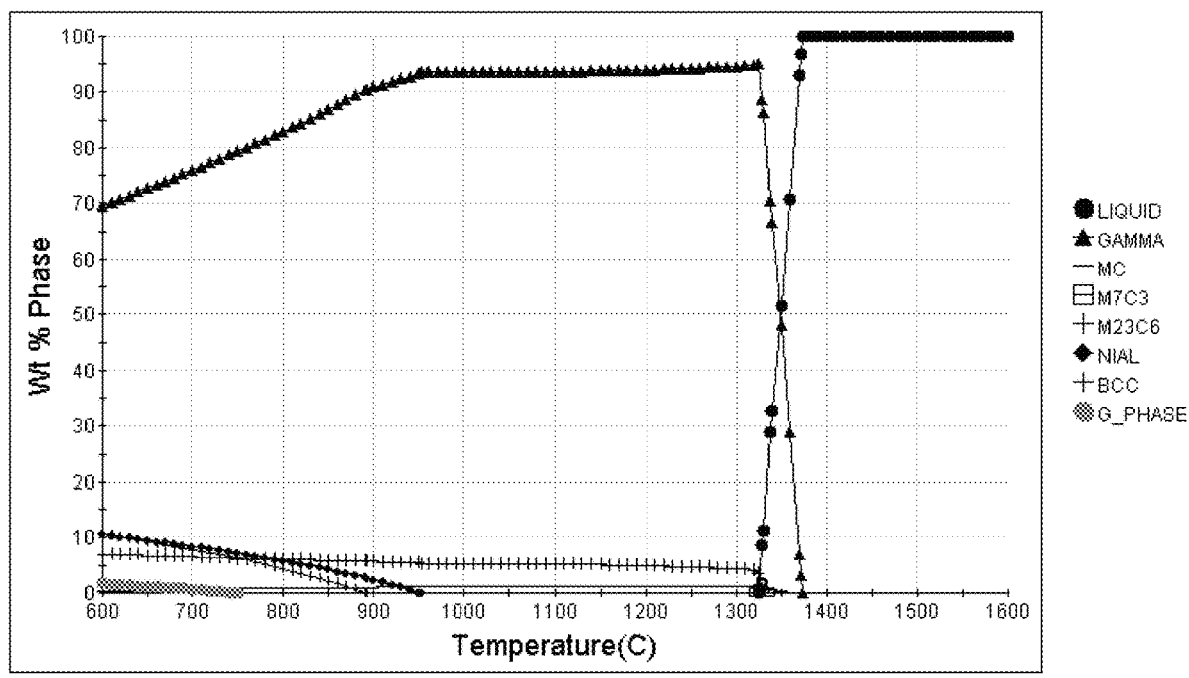
FIG. 20 is a calculated equilibrium phase diagram for alloy 11-20.
Figure 21:
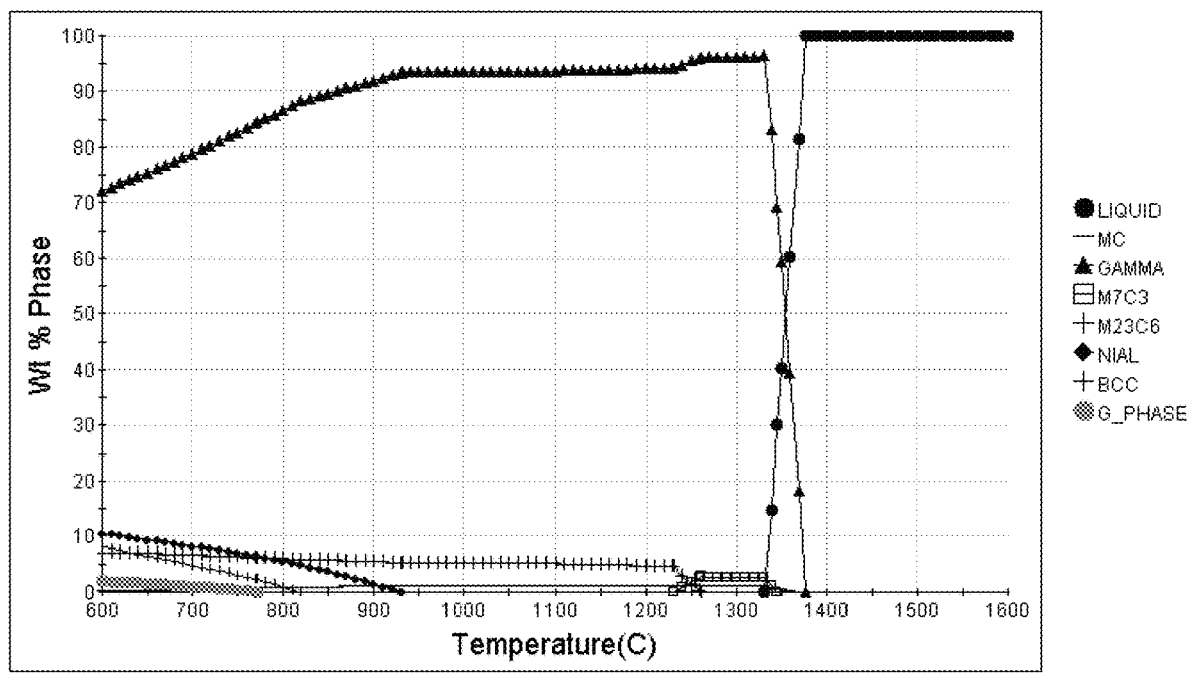
FIG. 21 is a calculated equilibrium phase diagram for alloy 11-21.
Figure 22:
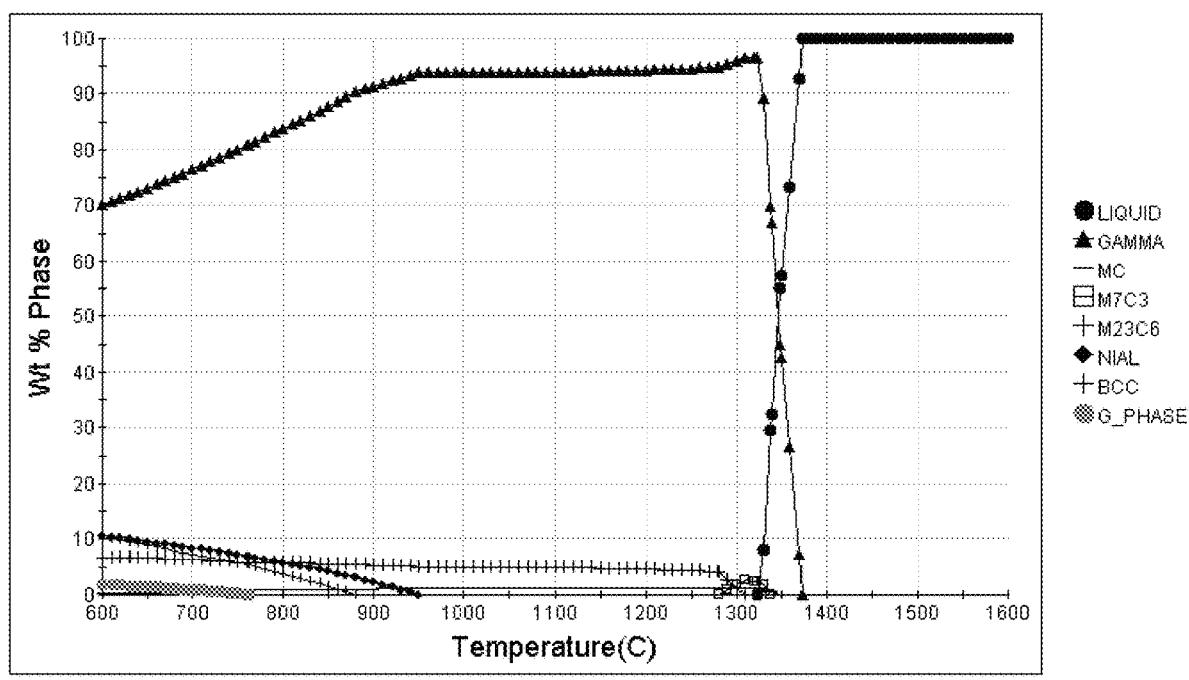
FIG. 22 is a calculated equilibrium phase diagram for alloy 11-22.
Figure 23:
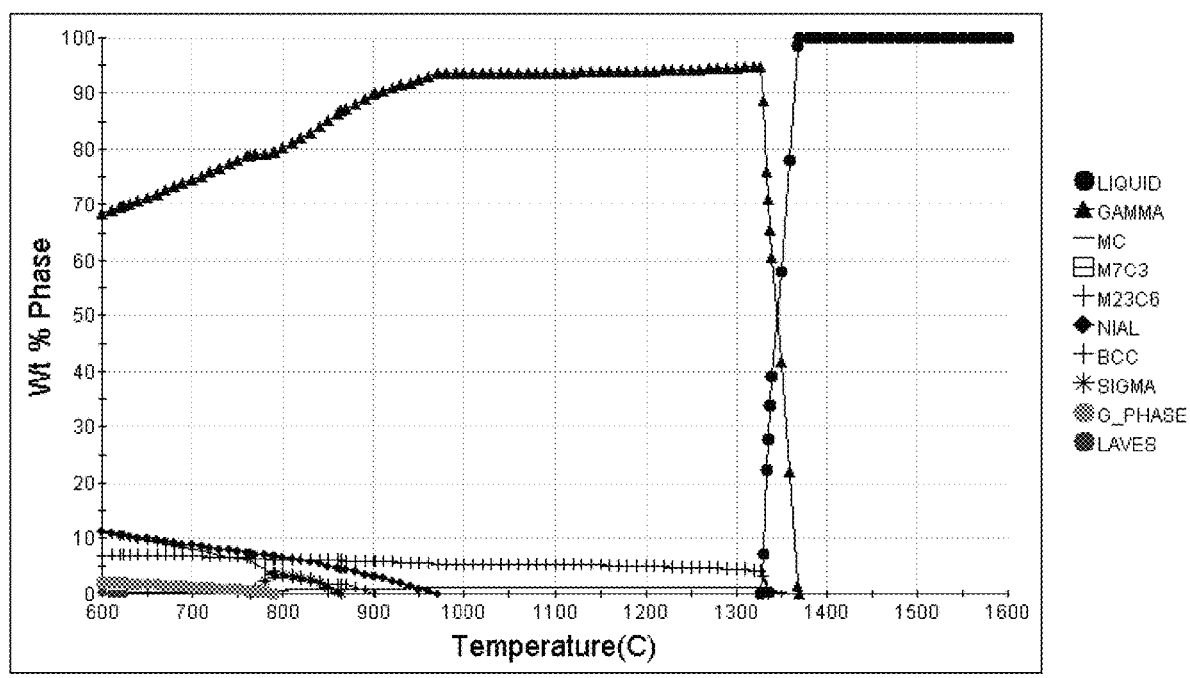
FIG. 23 is a calculated equilibrium phase diagram for alloy 11-23.
Figure 24:
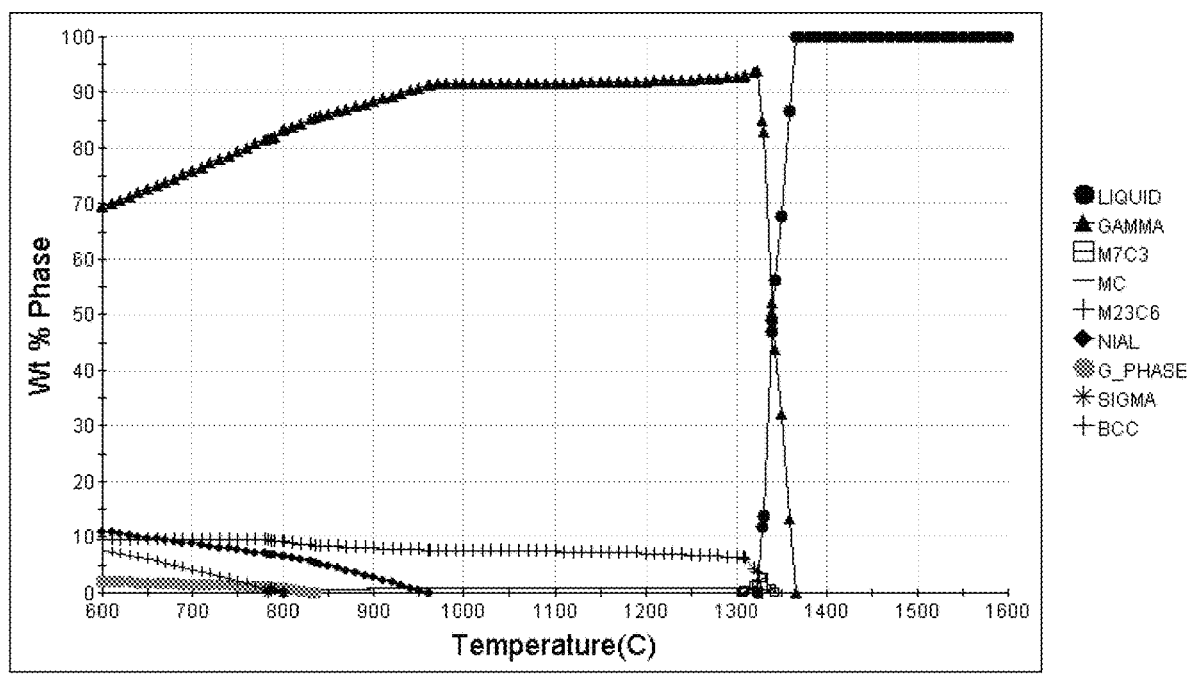
FIG. 24 is a calculated equilibrium phase diagram for alloy 11-24.
Figure 25:
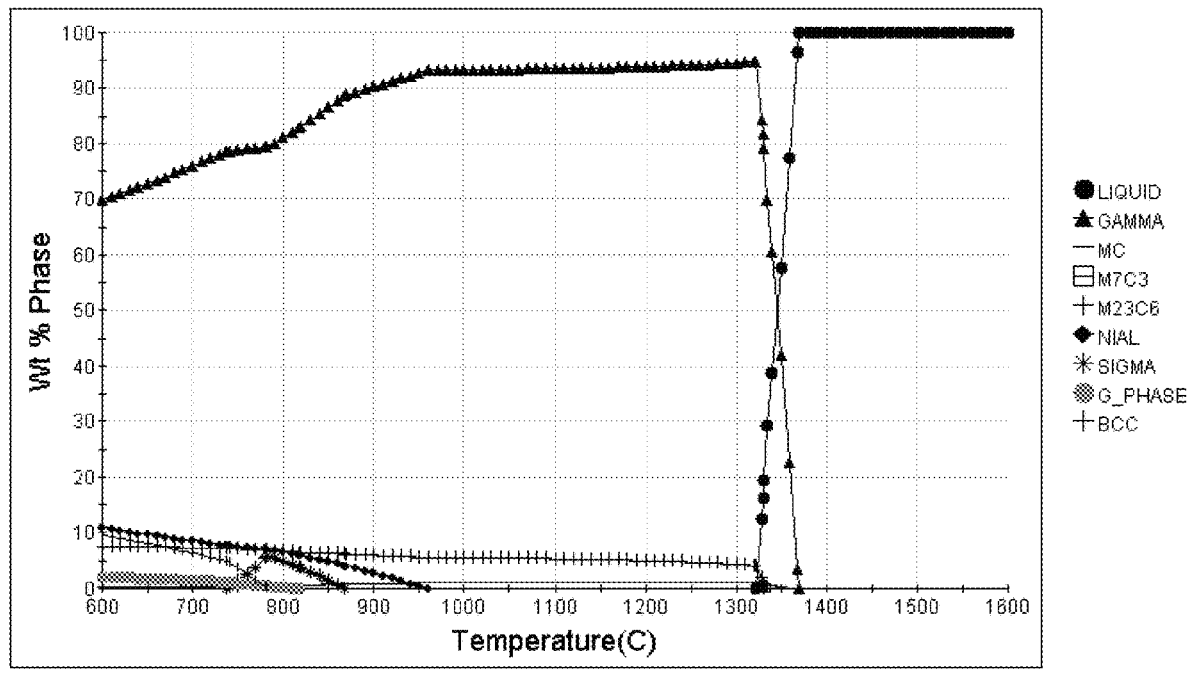
FIG. 25 is a calculated equilibrium phase diagram for alloy 11-25.
Figure 26:
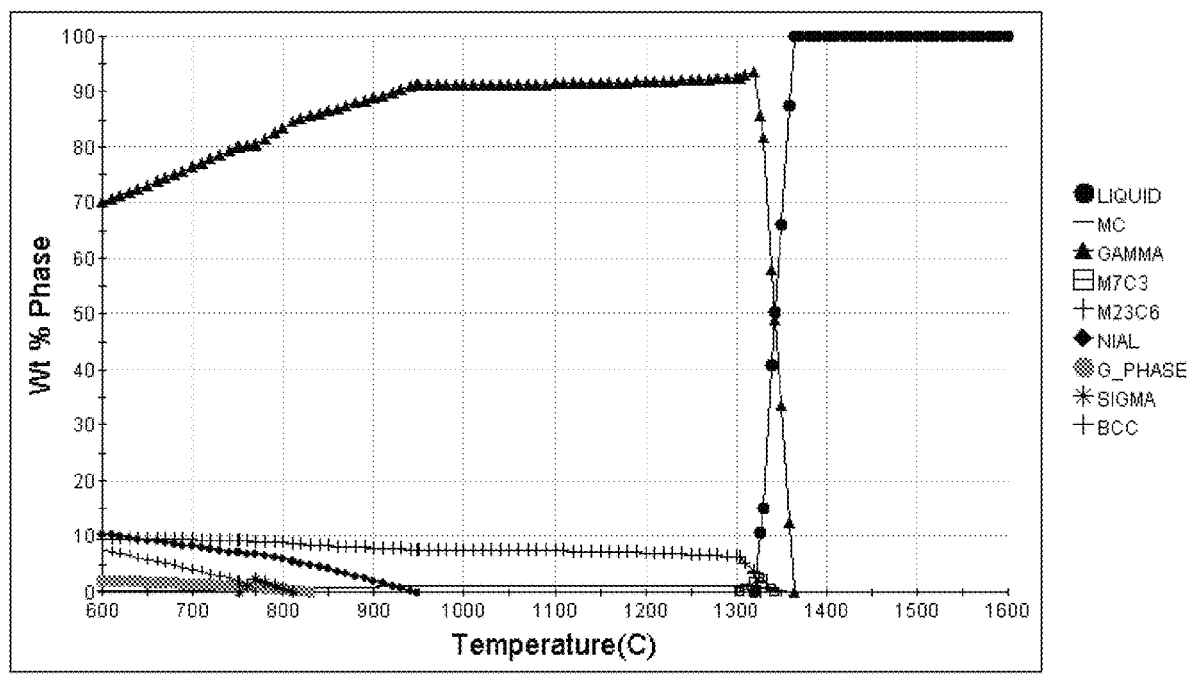
FIG. 26 is a calculated equilibrium phase diagram for alloy 11-26.
Figure 27:
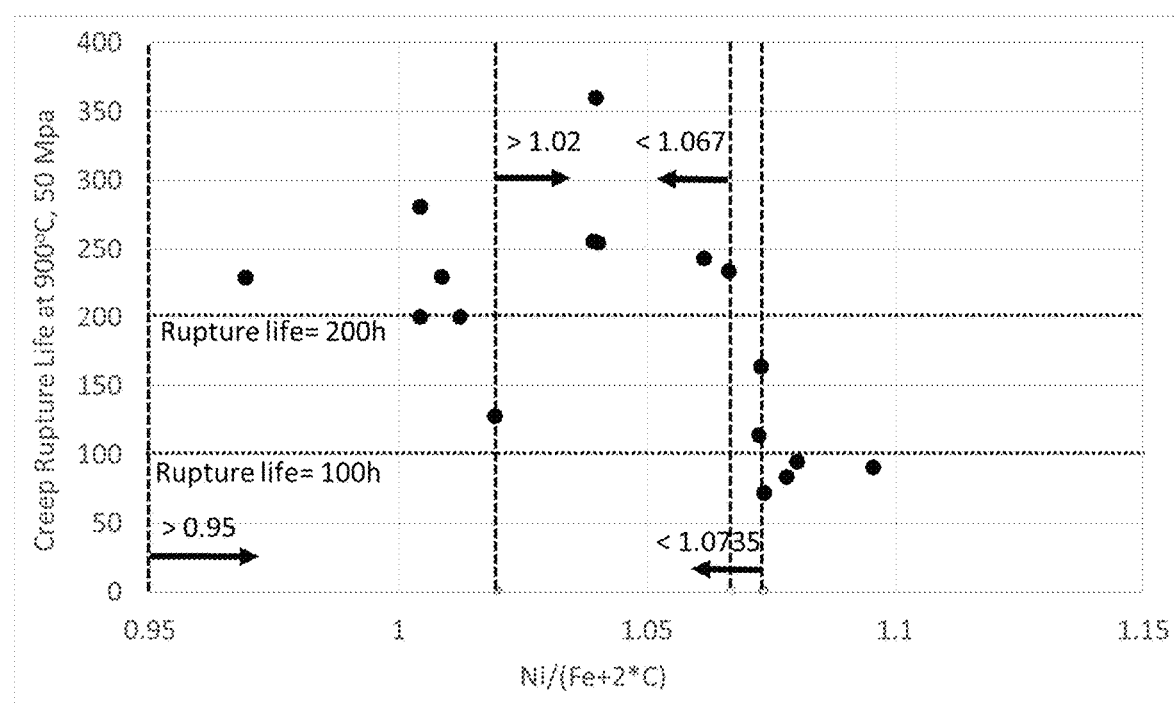
FIG. 27 is a plot of creep rupture life of the alloys tested at 900° C., 50 MPa, plotted as a function of Ni/(Fe+2*C).
Figure 28:
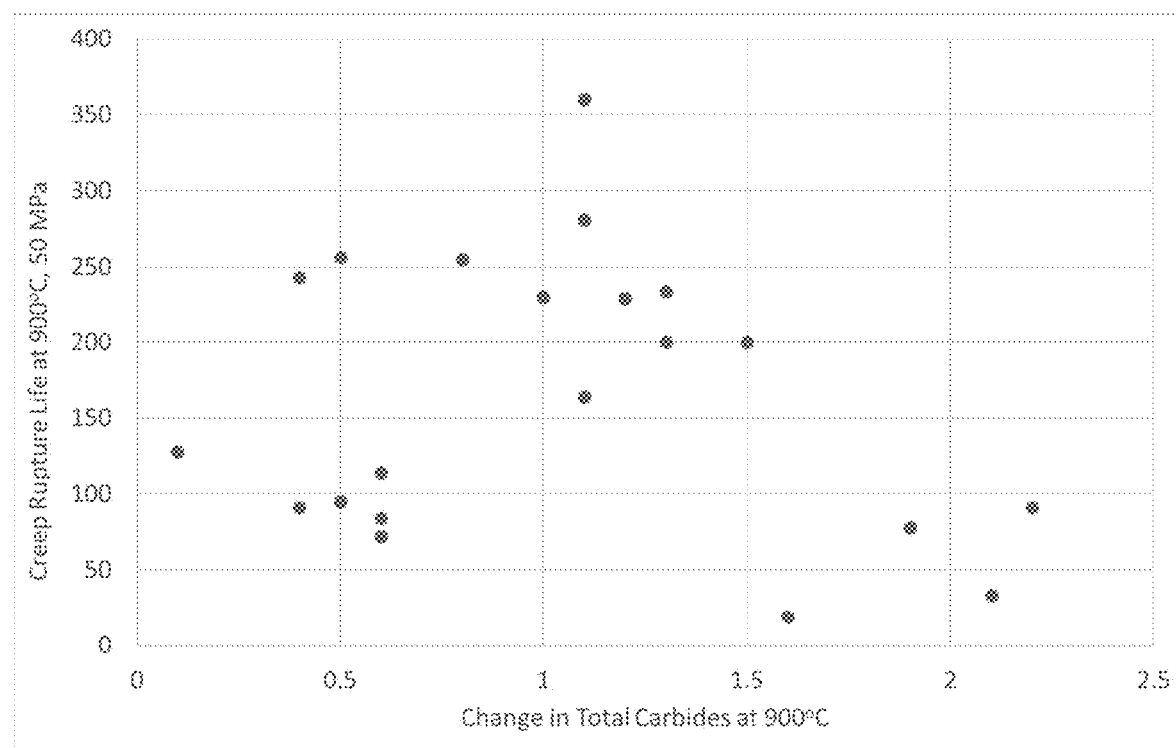
FIG. 28 is a plot of creep rupture life of the alloys tested at 900° C., 50 MPa, plotted as a function of the change in total carbides at 900° C. (wt. %).
Figure 29:
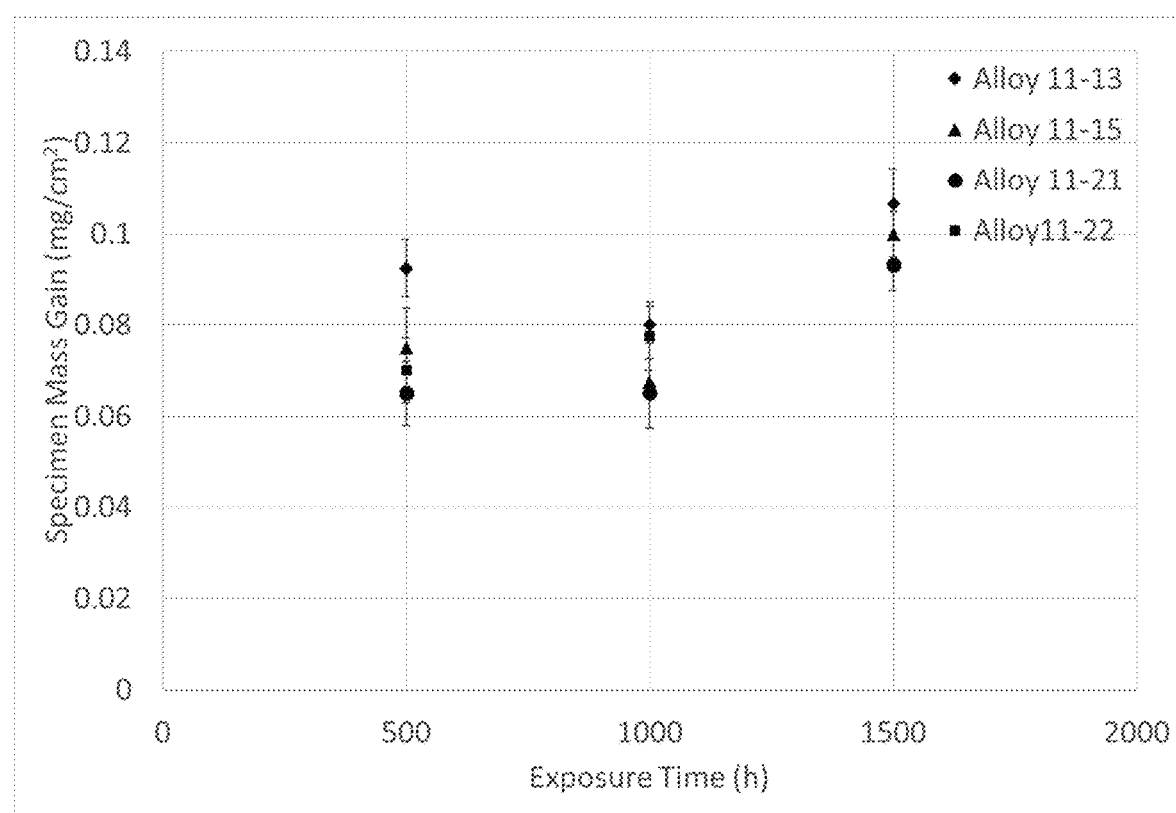
FIG. 29 shows the mass gain after the 500, 1000, and 1500 hour exposure to $sCO_2$ 750° C. and 300 bar obtained from 500 hour exposure cycles.
Figure 30:
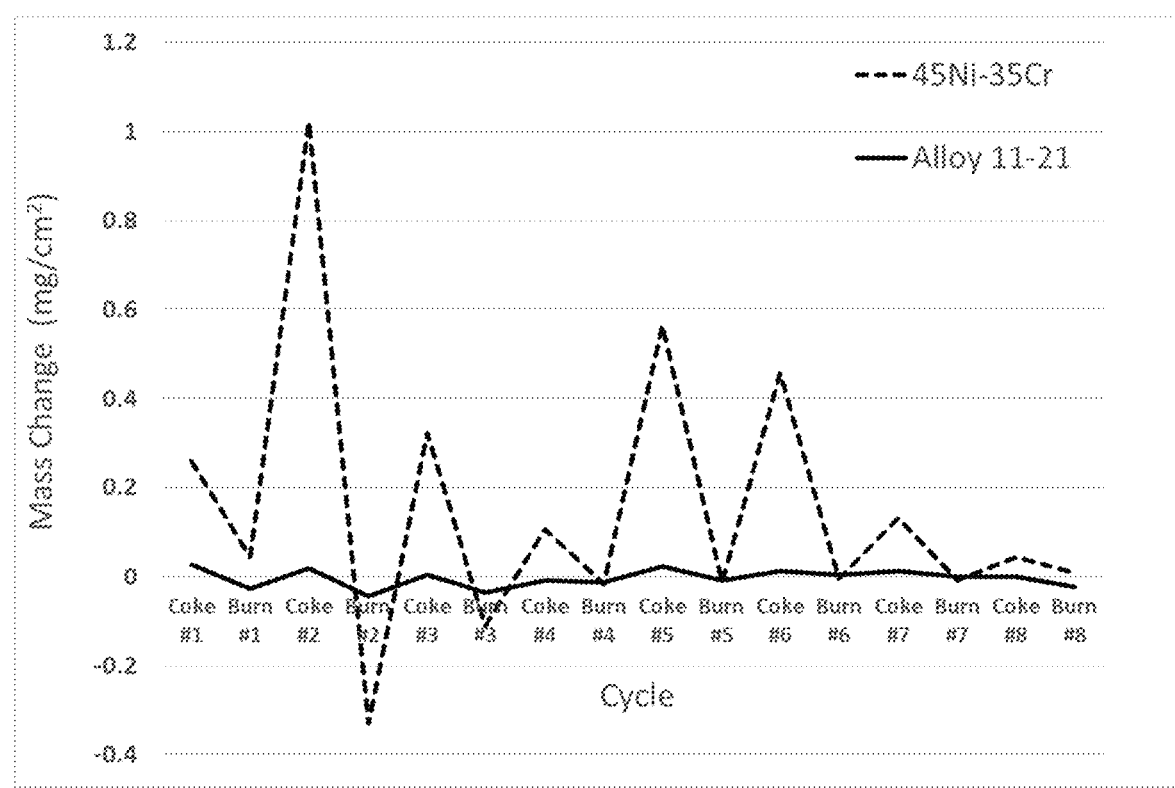
FIG. 30 is a plot of mass change in $mg/cm^2$ during a sequence of coking and decoking cycles of the baseline 45Ni-35Cr alloy, Alloy 11-21. Coking experiments were performed in ethane+steam at 850° C. for 8 hours followed by a decoking treatment in steam at 850° C. for 24 hours. Results show that Alloy 11-21 showed desirable lower coke deposition when compared to 45Ni-35Cr alloy.

Alumina-forming austenitic (AFA) stainless steels are a class of structural steel alloys which comprise aluminum (Al) at a weight percentage sufficient to form protective aluminum oxide (alumina, $Al_2O_3$) surface layers. The external continuous scale comprising alumina does not form at an Al level below about 2 weight percent. At an Al level higher than about 3 to 5 weight percent, the exact transition dependent on level of austenite stabilizing additions such as Ni (e.g. higher Ni can tolerate more Al), a significant bcc phase is formed in the alloy, which compromises the high temperature properties of the alloy such as creep strength. The external alumina scale is continuous at the alloy/scale interface and though $Al_2O_3$ rich the scale can contain some Mn, Cr, Fe and/or other metal additives such that the growth kinetics of the Al rich oxide scale is within the range of that for known alumina scale.

Nitrogen is found in some conventional $Cr_2O_3$-forming grades of austenitic alloys up to about 0.5 wt. % to enhance the strength of the alloy. The nitrogen levels in AFA alloys must be kept as low as possible to avoid detrimental reaction with the Al and achieve alloys which display oxidation resistance and high creep strength at high temperatures. Although processing will generally result in some uptake of N in the alloy, it is necessary to keep the level of N at less than about 0.06 wt % for the inventive alloys. When N is present, the Al forms internal nitrides, which can compromise the formation of the alumina scale needed for the desired oxidation resistance as well as a good creep resistance.

The addition of Ti and/or V is common to virtually all high-temperature austenitic stainless steels and related alloys to obtain high temperature creep strength, via precipitation of carbide and related phases. To permit the formation of the alloys of the invention and the alumina scale, the composition typically has to include little or no titanium or vanadium, with a combined level of less than about 0.5 weight percent. The addition of Ti and V shifts the oxidation behavior (possibly by increasing oxygen permeability) in the alloy such that Al is internally oxidized, requiring much higher levels of Al to form an external $Al_2O_3$ scale in the presence of Ti and V. At such high levels, the high temperature strength properties of the resulting alloy are compromised by stabilization of the weak bcc Fe phase.

Additions of Nb or Ta are necessary for alumina-scale formation. Too much Nb or Ta will negatively affect creep properties by promoting δ-Fe and brittle second phases.

Additionally, up to 3 weight percent Co, up to 3 weight percent Cu, and up to 2 weight percent Mo and up to 2 wt. W can be present in the alloy as desired to enhance specific properties of the alloy. Rare earth and reactive elements, such as Y, La, Ce, Hf, Zr, and the like, at a combined level of up to 1 weight percent can be included in the alloy composition as desired to enhance specific properties of the alloy. Other elements can be present as unavoidable impurities at a combined level of less than 1 weight percent.

Tolerance to nitrogen can be achieved by addition of more nitrogen active alloy additions than Al. Based on thermodynamic assessment, Hf, Ti, and Zr can be used to selectively getter N away from Al. The addition of Hf and Zr generally also offers further benefits for oxidation resistance via the well known reactive element effect, at levels up to 1 wt. %. Higher levels can result in internal oxidation and degraded oxidation resistance. Studies of AFA alloys have indicated degradation in oxidation resistance of AFA alloys with Ti and, especially, V additions or impurities, and has indicated limiting these additions to no more than 0.3 wt. % total. Assuming stoichiometric TiN formation, with 0.25 wt. % Ti up to around 0.06 wt. % N is possible, which is sufficient to manage and tolerate the N impurities encountered in air casting. A complication is that Ti will also react with C (as will Nb). Therefore, some combination of Hf or Zr and Ti is desirable to manage and tolerate N effectively.

This invention provides a class of alumina-forming austenitic stainless steels that use one or more carbides for high temperature tensile and creep strengths. High temperature strength is obtained through the precipitation of fine carbides throughout the matrix. Creep strength is achieved through the combined precipitation of fine carbides homogeneously in the matrix that act as obstacles to motion of dislocations along with coarse carbides on grain boundaries which prevent grain boundary sliding Carbides can be one or more of the following-MC-type, $M_7C_3$ type, $M_{23}C_6$ type or others. A certain amount of coarse non-equilibrium carbides could form during solidification and additional carbides can be precipitated during high temperature exposure in service or during creep testing. Precipitation of sufficient amount of fine carbides in the matrix during high temperature exposure is required to achieve good high temperature creep resistance. These carbides must also be stable for long periods of time at high temperatures to achieve optimum creep resistance.

Within the allowable ranges of elements, particularly those of Al, Cr, Ni, Fe, Mn, Mo, Si, Nb, Ta, Ti and, when present Co, W, and Cu, the levels of the elements are adjusted relative to their respective concentrations to achieve a stable fcc austenite phase matrix. The appropriate relative levels of these elements for a composition is readily determined or checked by comparison with commercially available databases or by computational thermodynamic models with the aid of programs such as Thermo-Calc® (Thermo-Calc Software, Solna, Sweden) or JMatPro® (Sente Software, Surrey Research Park, United Kingdom). In the casting of AFA steels, the partitioning of elements during solidification determines composition control. Non-equilibrium phases formed during solidification will modify the type and amount of strengthening phases.

Elements such as Cr, Nb, Ta, Ti, V, Zr, Hf and C alone and in combinations can form carbides and elements such as W, and Mo can partition to the carbides.

Thermodynamic models can also be used to predict the type and weight % carbides formed during solidification and type and wt. % carbides present in equilibrium at high temperatures when the carbon levels present in the alloy are included in the calculations along with the levels of other elements. The difference between carbides present in these two conditions can be used for the calculation of carbides that precipitate during high temperature exposures. Adequate precipitation of fine carbides during high temperature exposure is required for creep strength.

An austenitic Ni-base alloy according to the invention can comprise, consist essentially of, or consist of, in weight percent:

2.5 to 4.75 Al;
21 to 26 Cr;
20 to 40 Fe;
0.75 to 2.5 total of at least one element selected from the group consisting of Nb and Ta;
0 to 0.25 Ti;
0.09 to 1.5 Si;
0 to 0.5 V;
0 to 2 Mn;
0 to 3 Cu;
0 to 2 of at least one element selected from the group consisting of Mo and W;
0 to 1 of at least one element selected from the group consisting of Zr and Hf;
0 to 0.15 Y;
0.3 to 0.55 C;
0.005 to 0.1 B;
0 to 0.05 P;
less than 0.06 N; and
balance Ni (30 to 46 Ni). The weight percent Ni is greater than the weight percent Fe. The ratio Ni/(Fe+2*C) is between 0.95 and 1.0735. The alloy forms an external continuous scale comprising alumina, and has a stable phase FCC austenitic matrix microstructure. The austenitic matrix is essentially delta-ferrite-free and essentially BCC-phase free. The austenitic matrix consists of one or more carbide strengthening phases, and exhibits a creep rupture lifetime of at least 100 h at 900° C. and 50 MPa.

Ni/(Fe+2*C), where Ni, Fe, and C are expressed in weight. %, is more preferably between 0.95 and 1.0735 for a creep rupture lifetime of at least 100 h at 900° C. and 50 MPa and more preferably between 1.02 and 1.067 for a creep rupture lifetime of at least 200 h at 900° C. and 50 MPa. Ni/(Fe+2*C) can be 0.95, 0.96, 0.97, 0.98, 0.99, 1.00, 1.01, 1.02, 1.03, 1.04, 1.05, 1.06, 1.07, 1.0705, 1.0710, 1.0715, 1.0720, 1.0725, 1.0730, 1.0734, 1.07345, and 1.073495, or within a range of any high value and low value selected from these values.

The creep rupture life at 900° C. and 50 Mpa can be between 114 and 360 hours. The creep rupture life at 900° C. and 50 Mpa can be 114, 125, 150, 175, 200, 225, 250, 275, 300, 325, 350 or 360 hours. The creep rupture life at 900° C. and 50 MPa can be within a range of any high value and low value selected from these values.

The creep rupture life at 1150° C., 7.17 MPa can be between 200 and 1500 hours. The creep rupture life at 1150° C., 7.17 MPa can be 200, 250, 300, 350, 400, 450, 500, 550, 600, 650, 700, 750, 800, 850, 900, 9050, 1000, 1050, 1100, 1150, 1200, 1250, 1300, 1350, 1400, 1450, and 1500 hours, and can be within a range of any high value and low value selected from these values.

Al in weight % can be found within the range of 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7 or 4.75% Al. Al can have a weight % within a range of any high value and low value selected from these values.

Cr in weight % can be found within the range of 21, 21.25, 21.5, 21.75, 22, 22.25, 22.5, 22.75, 23, 23.25, 23.5, 23.75, 24, 24.25, 24.5, 24.75, 25, 25.25, 25.5, 25.75, or 26% Cr. Cr can have a weight % within a range of any high value and low value selected from these values.

Fe in weight % can be found within the range of 20, 21, 22, 23, 24, 25, 26, 27, 28, 29, 30, 31, 32, 33, 34, 35, 36, 37, 38, 39, or 40% Fe. The weight of Fe can be within a range of any high value and low value selected from these values.

Nb and Ta in weight % can be 0.75, 0.8, 0.85, 0.9, 0.95, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2, 2.05, 2.1, 2.15, 2.2, 2.25, 2.3, 2.35, 2.4, 2.45 or 2.5% Nb or Ta. The weight % of Nb and/or Ti can be within a range of any high value and low value selected from these values.

Ti in weight % can be found within the range of 0.1, 0.12, 0.13, 0.14, 0.15, 0.16, 0.17, 0.18, 0.19, 0.2, 0.21, 0.22, 0.23, 0.24, or 0.25% Ti. The weight % of Ti can be within a range of any high value and low value selected from these values.

Si in weight % can be 0.09, 0.1, 0.2, 0.3, 0.4, 0.5, 0.6, 0.7, 0.8, 0.9, 1, 1.1, 1.2, 1.3, 1.4, 1.5% Si. The weight % of Si can be within a range of any high value and low value selected from these values.

V in weight % can be 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49 or 0.5% V. The weight % of V can be within a range of any high value and low value selected from these values.

Mn in weight % can be found within the range of 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 2 Mn %. Mn can have a weight % within a range of any high value and low value selected from these values.

Cu in weight % can be found within the range of 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9 or 3 Cu %. Cu can have a weight % within a range of any high value and low value selected from these values.

Mo and W in weight % can be found within the range of 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 2 Mo and W %. Mo and W can have a weight % within a range of any high value and low value selected from these values.

Zr and/or Hf individually or collectively in weight % can be found within the range of 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.22, 0.24, 0.26, 0.28, 0.3, 0.32, 0.34, 0.36, 0.38, 0.4, 0.42, 0.44, 0.46, 0.48, 0.5, 0.52, 0.54, 0.56, 0.58, 0.6, 0.62, 0.64, 0.66, 0.68, 0.7, 0.72, 0.74, 0.76, 0.78, 0.8 or 1 Zr and Hf %. Zr and Hf can have a weight % within a range of any high value and low value selected from these values.

Y in weight % can be found within the range of 0, 0.01, 0.02, 0.03, 0.04, 0.05, 0.06, 0.07, 0.08, 0.09, 0.1, 0.11, 0.12, 0.13, 0.14 or 0.15 Y %. Y can have a weight % within a range of any high value and low value selected from these values.

C in weight % can be found within the range of 0.3, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54 or 0.55 C %. C can have a weight % within a range of any high value and low value selected from these values.

B in weight % can be found within the range of 0.005, 0.006, 0.007, 0.008, 0.009, 0.01, 0.02, 0.03, 0.04, 0.05, 0.06, 0.07, 0.08, 0.09 or 0.1 B %. B can have a weight % within a range of any high value and low value selected from these values.

P in weight % can be found within the range of 0, 0.005, 0.006, 0.007, 0.008, 0.009, 0.01, 0.011, 0.012, 0.013, 0.014, 0.015, 0.016, 0.017, 0.018, 0.019, 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049 or 0.05 P %. P can have a weight % within a range of any high value and low value selected from these values.

N in weight % can be found within the range of 0, 0.002, 0.004, 0.006, 0.008, 0.01, 0.012, 0.014, 0.016, 0.018, 0.02, 0.022, 0.024, 0.026, 0.028, 0.03, 0.032, 0.034, 0.036, 0.038, 0.04, 0.042, 0.044, 0.046, 0.048, 0.05, 0.052, 0.054, 0.056, 0.058 or 0.06 N %. N can have a weight % within a range of any high value and low value selected from these values.

Ni in weight % can be found within the range of 30, 31, 32, 33, 34, 35, 36, 37, 38, 39, 40, 41, 42, 43, 44, 45 or 46 Ni %. Ni can have a weight % within a range of any high value and low value selected from these values.

The mass change (mg/cm$^2$) at 2000 h at 900° C. in air+10% water vapor environment can be ±0.25, ±0.5, ±0.75.±1.0, ±1.25, ±1.5, ±1.75. and ±2.00. The mass change (mg/cm$^2$) at 2000 h at 900° C. in air+10% water vapor environment can be within a range of any high value and low value selected from these values.

The mass change (mg/cm$^2$) at 1000 h at 1000° C. in air+10% water vapor environment can be ±0.25, ±0.5, ±0.75.±1.0, ±1.25, ±1.5, ±1.75, ±2.00, ±2.25, ±2.5, ±2.75.±3.0, ±3.25, ±3.5, ±3.75 and ±4.00. The mass change (mg/cm$^2$) at 1000 h at 1000° C. in air+10% water vapor environment can be within a range of any high value and low value selected from these values.

The mass change (mg/cm$^2$) at 500 h at 1150° C. in air can be 0.35, 0.5, 1.0, 1.5, 2, 2.5, 3, 3.5, 43, 4.5, 5, or 5.1. The mass change (mg/cm$^2$) at 200 h at 1150° C. in air can be within a range of any high value and low value selected from these values.

The gamma phase after solidification can 85, 85.3, 85.7, 86, 86.3, 86.6, 86.9, 87.2, 87.5, 87.8, 88.1, 88.4, 88.7, 89, 89.3, 89.6, 89.9, 90.2, and 90.4 wt. %. The gamma phase after solidification can be within a range of any high value and low value selected from these values.

The NiAl phase after solidification can be 0.9, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, 6.2, 6.4, 6.6, 6.8, 7, 7.2, 7.4, 7.6, or 7.8 wt. %. The NiAl phase after solidification can be within a range of any high value and low value selected from these values.

The MC phase after solidification can be 0.9, 1, 1.1, 1.2, 1.3, 1.4, 1.5, 1.6, 1.7, 1.8, 1.9, 2, 2.1, 2.2, 2.3, 2.4, 2.5 or 2.6 wt. %. The MC phase in weight percent after solidification can be within a range of any high value and low value selected from these values.

The $M_{23}C_6$ phase after solidification can be 2.6, 2.8, 3, 3.2, 3.4, 3.6, 3.8, 4, 4.2, 4.4, 4.6, 4.8, 5, 5.2, 5.4, 5.5, 5.6, 5.8, 6.0, 6.2, 6.4, 6.6, 6.8, 7.0, 7.2, 7.4, 7.6 or 7.8 wt. %. The $M_{23}C_6$ phase in weight percent after solidification can be within a range of any high value and low value selected from these values.

The $M_7C_3$ phase after solidification can be 0.0, 0.2, 0.4, 0.6, 0.8, 1.0, 1.2, 1.4, 1.6, 1.8 or 1.9 wt. %. The $M_7C_3$ phase in weight percent after solidification can be within a range of any high value and low value selected from these values.

The total carbides after solidification can be 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8 or 8.9 wt. %. The total carbides in weight percent after solidification can be within a range of any high value and low value selected from these values.

The gamma phase at 900° C. can be 85.7, 86, 86.3, 86.6, 86.9, 87.2, 87.5, 87.8, 88.1, 88.4, 88.7, 89, 89.3, 89.6, 89.9, 91.2, 91.5, 91.8, 92.1, 92.4, 92.7 or 93 wt. %. The gamma phase at 900° C. can be within a range of any high value and low value selected from these values.

The NiAl phase at 900° C. can be 0.0, 0.2, 0.4, 0.6, 0.8, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, 6.2, 6.4, 6.6, 6.8, 7, 7.2, or 7.4 wt. %. The NiAl phase at 900° C. can be within a range of any high value and low value selected from these values.

The MC phase at 900° C. can be 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5 or 2.6 wt. %. The MC phase in weight percent at 900° C. can be within a range of any high value and low value selected from these values.

The $M_{23}C_6$ phase at 900° C. can be 2.8, 3, 3.2, 3.4, 3.6, 3.8, 4, 4.2, 4.4, 4.6, 4.8, 5, 5.2, 5.4, 5.6, 5.8, 6, 6.2, 6.4, 6.6, 6.8, 7, 7.2, 7.4, 7.6, 7.8, 8, 8.2, 8.4, 8.6, or 8.7 wt. %. The $M_{23}C_6$ phase in weight percent at 900° C. can be within a range of any high value and low value selected from these values.

The total carbides at 900° C. can be 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9.0, 9.1, 9.2, or 9.3 wt. %. The total carbides in weight percent at 900° C. can be within a range of any high value and low value selected from these values.

The change in $M_{23}C_6$ at 900° C. can be 0.2, 0.4, 0.6, 0.8, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6 or 4.7 wt. %. The total change in $M_{23}C_6$ at 900° C. can be within a range of any high value and low value selected from these values.

The change in total carbides at 900° C. can be 0.4, 0.5, 0.6, 0.7, 0.8, 0.9, 1.0, 1.1, 1.2, 1.3, 1.4, 1.5, 1.6, 1.7, 1.8, 1.9, 1.0, 2.1, or 2.2 wt. %. The total change in carbides at 900° C. can be within a range of any high value and low value selected from these values.

The gamma phase at 1150° C. can be 91.6, 91.8, 92, 92.2, 92.4, 92.6, 92.8, 93, 93.2, 93.4, 93.6, 93.8, 94, 94.2, 94.4, 94.6, 94.8, 95 or 95.2 wt. %. The Gamma phase at 1150° C. can be within a range of any high value and low value selected from these values.

The MC phase at 1150° C. can be 0.9, 1, 1.1, 1.2, 1.3, 1.4, 1.5, 1.6, 1.7, 1.8, 1.9, 2, 2.1, 2.2, 2.3, 2.4, 2.5, 2.6 or 2.7 wt. %. The MC phase in weight percent at 1150° C. can be within a range of any high value and low value selected from these values.

The $M_{23}C_6$ phase at 1150° C. can be 2.1, 2.3, 2.5, 2.7, 2.9, 3.1, 3.3, 3.5, 3.7, 3.9, 4.1, 4.3, 4.5, 4.7, 4.9, 5.1, 5.3, 5.5, 5.7, 5.9, 6.1, 6.3, 6.5, 6.7, 6.9, 7.1, 7.3, 7.5, or 7.7 wt. %. The $M_{23}C_6$ phase in weight percent at 1150° C. can be within a range of any high value and low value selected from these values.

The change in $M_{23}C_6$ at 1150° C. can be −0.5, −0.3, −0.1, 0.0, 0.2, 0.4, 0.6, 0.8, 1.0, 1.2, 1.4, 1.6, 1.8, 2.0, 2.2, 2.4, 2.6, 2.8, 3.0, 3.2, 3.4, 3.6, or 3.8 wt %. The change in $M_{23}C_6$ at 1150° C. can within a range of any high value and low value selected from these values.

The total carbides at 1150° C. can be 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8 or 8.9 wt. %. The total carbides in weight percent at 1150° C. can be within a range of any high value and low value selected from these values.

The change in total carbides at 1150° C. can be −0.4, −0.2, −0.1, 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, or 2.2 wt. %. The change in total carbides at 1150° C. can be within a range of any high value and low value selected from these values.

The mass change (mg/cm$^2$) at 1000 h at 1100° C. in air+10% water vapor tested in 100 h cycles can be ±0.25, ±0.5, ±0.75.±1.0, ±1.25, ±1.5, ±1.75. and ±2.0. The mass change (mg/cm$^2$) at 1000 h at 1100° C. in air+10% water vapor can be within a range of any high value and low value selected from these values.

The mass change (mg/cm$^2$) at 2000 h at 1100° C. in air+10% water vapor tested in 100 h cycles can be ±0.25, ±0.5, ±0.75.±1.0, ±1.25, ±1.5, ±1.75. and ±2.0. The mass change (mg/cm$^2$) at 2000 h at 1100° C. in air+10% water vapor can be within a range of any high value and low value selected from these values.

The mass change (mg/cm$^2$) at 200 h at 1150° C. in air tested in 100 h cycles can be ±0.25, ±0.5, ±0.75.±1.0, ±1.25, ±1.5, ±1.75.±2.0, ±2.25, ±2.5, ±2.75.±3.0, ±3.25, ±3.5, ±3.75, ±4.0±4.25, ±4.5, ±4.75.±5.0, and ±5.25. The mass change (mg/cm$^2$) at 200 h at 1150° C. in air can be within a range of any high value and low value selected from these values.

The mass change (mg/cm$^2$) at 1000 h at 1150° C. in air tested in 100 h cycles can be ±0.25, ±0.5, ±0.75.±1.0, ±1.25, ±1.5, ±1.75.±2.0, ±2.25, ±2.5, ±2.75.±3.0, ±3.25, ±3.5, ±3.75, ±4.0±4.25, ±4.5, ±4.75.±5.0, and ±5.25. The mass change (mg/cm$^2$) at 1000 h at 1150° C. in air can be within a range of any high value and low value selected from these values The mass gain after 500 hour exposure to sCO$_2$ 750° C. and 300 bar obtained from 500 hour exposure cycles can be 0.04, 0.05, 0.06, 0.07, 0.08, 0.09, 0.10, 0.11, 0.12, 0.13, or 0.14. The mass gain after 500 hour exposure to sCO$_2$ 750° C. and 300 bar obtained from 500 hour exposure cycles can be within aa range of any high value and low value selected from these values.

The mass gain after 1000 hour exposure to sCO$_2$ 750° C. and 300 bar obtained from 500 hour exposure cycles can be 0.04, 0.05, 0.06, 0.07, 0.08, 0.09, 0.10, 0.11, 0.12, 0.13, or 0.14. The mass gain after 1000 hour exposure to sCO$_2$ 750° C. and 300 bar obtained from 500 hour exposure cycles can be within aa range of any high value and low value selected from these values.

The mass gain after 1500 hour exposure to sCO$_2$ 750° C. and 300 bar obtained from 500 hour exposure cycles can be 0.04, 0.05, 0.06, 0.07, 0.08, 0.09, 0.10, 0.11, 0.12, 0.13, or 0.14. The mass gain after 1500 hour exposure to sCO$_2$ 750° C. and 300 bar obtained from 500 hour exposure cycles can be within aa range of any high value and low value selected from these values.

Mass change in mg/cm$^2$ due to deposition of coke during coking tests in coking and decoking cycles in ethane+steam at 850° C. for 8 hours can be 0.1, 0.2, 0.3, 0.4, 0.5, 0.6, 0.7, 0.8, 0.9, or 1.0. The mass change in mg/cm$^2$ due to deposition of coke during coking and decoking cycles in ethane+steam at 850° C. for 8 hours can be within a range of any high value and low value selected from these values.

TABLE 1

Compositions of reference alloys and invention alloys

Composition, wt %

| Alloy ID | Ni | Al | Cr | Fe | Hf | Mn | Mo | Nb | Si | Ti | W | Y | Zr | B | C | Ni/(Fe + 2*C) |
|---|---|---|---|---|---|---|---|---|---|---|---|---|---|---|---|---|
| Reference Alloys | | | | | | | | | | | | | | | | |
| HP | 34.2 | 0 | 25.8 | 35.9 | — | 0.6 | 0.04 | 1.1 | 1.6 | 0 | 0.24 | — | — | — | 0.42 | 0.93 |
| CAFA4 | 25.3 | 3.49 | 14.1 | 49.9 | — | 1.92 | 1.98 | 0.94 | 0.48 | 0 | 1.0 | 0.01 | 0 | — | 0.3 | 0.5 |
| Alloy 11-1 | 35.85 | 4 | 24.23 | 32.57 | 0.05 | — | 0.94 | 0.98 | 0.45 | 0 | 0.49 | 0.01 | 0 | 0.006 | 0.41 | 1.073674 |
| Alloy 11-2 | 35.97 | 3.99 | 24.16 | 32.54 | 0 | — | 0.94 | 1 | 0.47 | 0 | 0.49 | 0.01 | 0 | 0.006 | 0.41 | 1.078237 |
| Alloy 11-3 | 35.11 | 4.04 | 24.38 | 31.5 | 0 | — | 1.93 | 1 | 0.52 | 0 | 0.99 | 0.01 | 0 | 0.007 | 0.5 | 1.080308 |
| Alloy 11-4 | 35.17 | 4.06 | 24.52 | 31.08 | 0.15 | — | 1.94 | 1.02 | 0.51 | 0 | 1.01 | 0.01 | 0 | 0.006 | 0.51 | 1.095639 |
| Alloy 11-5 | 39.18 | 4.53 | 25.28 | 27.17 | 0.11 | — | 1 | 1.05 | 0.55 | 0 | 0.58 | 0.03 | 0 | 0.008 | 0.5 | 1.390841 |
| Alloy 11-6 | 44.65 | 4.24 | 25.15 | 23.95 | 0.12 | — | 0 | 1.04 | 0.37 | 0 | 0 | 0.03 | 0.01 | 0.008 | 0.42 | 1.801129 |
| Alloy 11-7 | 44.11 | 4.48 | 25.17 | 22.63 | 0 | — | 1 | 1.05 | 0.53 | 0 | 0.52 | 0 | 0 | 0.005 | 0.49 | 1.868276 |
| Alloy 11-8 | 44.37 | 4.28 | 25.15 | 22.44 | 0.12 | — | 0.99 | 1.02 | 0.53 | 0 | 0.52 | 0.03 | 0.01 | 0.008 | 0.51 | 1.891304 |
| Invention Alloys | | | | | | | | | | | | | | | | |
| Alloy 11-9 | 32.13 | 4.18 | 25 | 32.12 | 0 | — | 0.97 | 1.01 | 0.41 | 0 | 0.5 | 0 | 0 | 0.007 | 0.51 | 0.969231 |
| Alloy 11-10 | 34.94 | 4.03 | 23.81 | 34.61 | 0.15 | — | 0.1 | 1 | 0.26 | 0.14 | 0.12 | 0.07 | 0 | 0.013 | 0.4 | 0.986727 |
| Alloy 11-11 | 35.05 | 4.01 | 23.77 | 34.73 | 0.16 | — | 0.1 | 1.01 | 0.23 | 0.01 | 0.11 | 0.066 | 0 | 0.014 | 0.39 | 0.987046 |
| Alloy 11-12 | 35.16 | 3.98 | 23.69 | 34.4 | 0.16 | — | 0.1 | 1 | 0.25 | 0.15 | 0.13 | 0.074 | 0 | 0.014 | 0.5 | 0.993220 |
| Alloy 11-13 | 35.4 | 3.98 | 23.58 | 34.41 | 0.16 | — | 0.1 | 1 | 0.28 | 0.01 | 0.12 | 0.075 | 0.01 | 0.015 | 0.5 | 0.999718 |
| Alloy 11-14 | 35.1 | 4.21 | 24.61 | 34.15 | 0.11 | — | 0 | 0.87 | 0.49 | 0 | 0 | 0.01 | 0 | 0.007 | 0.4 | 1.004292 |
| Alloy 11-16 | 34.65 | 4.68 | 25.16 | 33.55 | 0.12 | — | 0 | 0.89 | 0.51 | 0 | 0 | 0.01 | 0 | 0.007 | 0.4 | 1.004322 |
| Alloy 11-17 | 35.26 | 4.03 | 24.74 | 34.01 | 0 | — | 0 | 1.01 | 0.51 | 0 | 0 | 0 | 0 | 0.007 | 0.41 | 1.008734 |
| Alloy 11-18 | 35.1 | 4.18 | 25.02 | 33.68 | 0.12 | — | 0 | 0.93 | 0.5 | 0 | 0 | 0.01 | 0 | 0.007 | 0.41 | 1.012346 |
| Alloy 11-15 | 34.86 | 3.99 | 23.12 | 33.25 | 0.17 | — | 1.17 | 1.49 | 0.58 | 0 | 0.55 | 0.04 | 0 | 0.015 | 0.5 | 1.017391 |
| Alloy 11-19 | 34.46 | 3.84 | 25.25 | 32.98 | 0.12 | — | 0 | 2.46 | 0.52 | 0 | 0 | 0.04 | 0 | 0.006 | 0.41 | 1.019527 |
| Alloy 11-20 | 35.13 | 3.98 | 25.35 | 33 | 0.15 | — | 0 | 1.01 | 0.41 | 0 | 0.51 | 0.027 | 0 | 0.008 | 0.4 | 1.039349 |
| Alloy 11-21 | 36.16 | 4.01 | 23.76 | 33.96 | 0.16 | — | 0 | 1.49 | 0 | 0 | 0 | 0.02 | 0.01 | 0.007 | 0.41 | 1.039678 |
| Alloy 11-22 | 35.43 | 4 | 25.2 | 33.26 | 0 | — | 0 | 1.03 | 0.46 | 0 | 0 | 0.04 | 0.11 | 0.009 | 0.4 | 1.040223 |
| Alloy 11-23 | 35.25 | 4.02 | 25.16 | 32.43 | 0.15 | — | 0 | 1 | 0.5 | 0 | 1.05 | 0.014 | 0 | 0.005 | 0.39 | 1.061427 |
| Alloy 11-24 | 35.75 | 4.05 | 24.17 | 32.52 | 0 | — | 0.95 | 0.98 | 0.5 | 0 | 0.5 | 0.06 | 0 | 0.006 | 0.5 | 1.066527 |
| Alloy 11-25 | 35.78 | 4.01 | 24.14 | 32.56 | 0.14 | — | 0.94 | 1 | 0.5 | 0 | 0.49 | 0.01 | 0 | 0.006 | 0.4 | 1.072542 |
| Alloy 11-26 | 35.84 | 3.96 | 24.14 | 32.38 | 0.14 | — | 0.95 | 1 | 0.51 | 0 | 0.5 | 0.02 | 0.01 | 0.012 | 0.51 | 1.073054 |

TABLE 2

Mass change during oxidation at 900° C., 1000° C., 1100° C., and 1150° C.

| Alloy ID | Ni/(Fe + 2*C) | Rupture life, h (900° C., 50 Mpa) | Mass change, mg/cm² (2 kh in Air + 10% water vapor 900° C.) | Mass change, mg/cm² (1 kh Air + 10% water vapor at 1000° C.) | Mass change, mg/cm² (2 kh in Air + 10% water vapor 1100° C.) | Mass change, mg/cm² (200 h in Air at 1150° C.) |
|---|---|---|---|---|---|---|
| Reference Alloys | | | | | | |
| HP | 0.93 | 250 | −12.7 | −8.4 | −221.09 | −4.27 |
| Alloy 11-1 | 1.073674 | 72 | 0.28 | 0.53 | 0.00 | 0.62 |
| Alloy 11-2 | 1.078237 | 84 | 0.23 | 0.72 | −1.36 | 0.96 |
| Alloy 11-3 | 1.080308 | 95 | — | — | −0.35 | 0.63 |
| Alloy 11-4 | 1.095639 | 91 | — | — | −0.64 | 0.88 |
| Alloy 11-5 | 1.390841 | 78 | — | 1 | | 0.85 |
| Alloy 11-6 | 1.801129 | 19 | — | — | 1.08 | 0.78 |
| Alloy 11-7 | 1.868276 | 91 | — | — | | 2.59 |
| Alloy 11-8 | 1.891304 | 33 | — | — | 1.10 | 0.97 |
| Invention Alloys | | | | | | |
| Alloy 11-9 | 0.969231 | 229 | — | 3.69 | | 5.1 |
| Alloy 11-10 | 0.986727 | — | 0.32 | — | −0.37 | — |
| Alloy 11-11 | 0.987046 | — | 0.3 | — | −0.46 | — |
| Alloy 11-12 | 0.993220 | — | 0.34 | — | −1.32 | — |
| Alloy 11-13 | 0.999718 | — | 0.36 | — | −1.51 | 0.4 |
| Alloy 11-14 | 1.004292 | 281 | 0.36 | 0.59 | 0.72 | 1.03 |
| Alloy 11-16 | 1.004322 | 200 | — | 0.64 | −1.08 | — |
| Alloy 11-17 | 1.008734 | 230 | 0.7 | 1.11 | 0.42 | — |
| Alloy 11-18 | 1.012346 | 200 | — | 0.56 | | |

TABLE 2-continued

Mass change during oxidation at 900° C., 1000° C., 1100° C., and 1150° C.

| Alloy ID | Ni/(Fe + 2*C) | Rupture life, h (900° C., 50 Mpa) | Mass change, mg/cm² (2 kh in Air + 10% water vapor 900° C.) | Mass change, mg/cm² (1 kh Air + 10% water vapor at 1000° C.) | Mass change, mg/cm² (2 kh in Air + 10% water vapor 1100° C.) | Mass change, mg/cm² (200 h in Air at 1150° C.) |
|---|---|---|---|---|---|---|
| Alloy 11-15 | 1.017391 | — | — | — | −0.08 | 5.1 |
| Alloy 11-19 | 1.019527 | 128 | — | — | 0.09 | — |
| Alloy 11-20 | 1.039349 | 256 | — | — | −0.57 | — |
| Alloy 11-21 | 1.039678 | 360 | 0.5 | 1.65 | 0.48 | 0.47 |
| Alloy 11-22 | 1.040223 | 255 | 0.33 | 0.59 | 0.42 | 0.35 |
| Alloy 11-23 | 1.061427 | 243 | — | — | −0.58 | — |
| Alloy 11-24 | 1.066527 | 234 | — | — | −1.40 | 0.53 |
| Alloy 11-25 | 1.072542 | 114 | 0.33 | 0.57 | −0.29 | 1 |
| Alloy 11-26 | 1.073054 | 164 | — | 0.92 | −0.54 | 0.95 |

TABLE 3

Mass change at 1100° C. in air + 10% water vapor environment

| Alloy ID | 100 h | 500 h | 1000 h | 2000 h | 3000 h | 4000 h | 5000 h |
|---|---|---|---|---|---|---|---|
| Reference Alloys | | | | | | | |
| HP | 2.28 | −30.51 | −148.33 | −221.09 | — | — | — |
| Alloy 11-1 | 0.36 | 0.71 | 0.84 | 0.00 | −0.50 | | |
| Alloy 11-2 | 0.51 | 0.82 | 0.36 | −1.36 | −2.65 | | |
| Alloy 11-3 | 0.35 | 0.68 | 0.75 | −0.35 | −1.39 | | |
| Alloy 11-4 | 0.47 | 0.99 | 0.74 | −0.64 | −1.20 | −1.47 | −1.82 |
| Alloy 11-5 | 0.51 | 0.65 | 0.04 | | | | |
| Alloy 11-6 | 0.49 | 0.79 | 1.02 | 1.08 | 0.68 | | |
| Alloy 11-7 | 2.27 | −10.47 | −25.51 | | | | |
| Alloy 11-8 | 0.52 | 0.90 | 1.09 | 1.10 | −0.25 | | |
| Invention Alloys | | | | | | | |
| Alloy 11-9 | 1.23 | −14.79 | −31.04 | | | | |
| Alloy 11-10 | 0.69 | 0.78 | 0.10 | −0.37 | −1.03 | | |
| Alloy 11-11 | 0.68 | 0.84 | 0.10 | −0.46 | −1.25 | | |
| Alloy 11-12 | 0.70 | 0.14 | −0.71 | −1.32 | −1.95 | | |
| Alloy 11-13 | 0.43 | 0.09 | −0.76 | −1.51 | −2.14 | | |
| Alloy 11-14 | 0.48 | 0.73 | 1.00 | 0.72 | 0.05 | −1.00 | −1.73 |
| Alloy 11-16 | 0.34 | 0.28 | −0.13 | −1.08 | −1.90 | −2.52 | −3.09 |
| Alloy 11-17 | 0.72 | 1.04 | 1.14 | 0.42 | −0.08 | −0.96 | −1.77 |
| Alloy 11-18 | 0.43 | −5.76 | −8.84 | | | | |
| Alloy 11-15 | 0.22 | 0.66 | 0.52 | −0.08 | −0.74 | −1.37 | −1.93 |
| Alloy 11-19 | 0.73 | 1.09 | 1.00 | 0.09 | −0.38 | −0.77 | −1.23 |
| Alloy 11-20 | 0.33 | 0.41 | 0.02 | −0.57 | −1.05 | −1.36 | −1.64 |
| Alloy 11-21 | 0.38 | 0.67 | 0.69 | 0.48 | 0.23 | −0.17 | −0.40 |
| Alloy 11-22 | −0.04 | 0.27 | 0.61 | 0.42 | 0.10 | −0.35 | −0.93 |
| Alloy 11-23 | 0.45 | 0.71 | 0.30 | −0.58 | −1.26 | −1.84 | −2.41 |
| Alloy 11-24 | 0.66 | 0.91 | 0.35 | −1.40 | −3.25 | | |
| Alloy 11-25 | 0.56 | 0.91 | 0.61 | −0.29 | −0.92 | −1.57 | −2.00 |
| Alloy 11-26 | 0.46 | 0.79 | 0.39 | −0.54 | −1.33 | −1.78 | −2.13 |

TABLE 4

Mass change at 1150° C. in air environment

| Alloy ID | 100 h | 500 h | 1000 h | 1500 h | 2000 h |
|---|---|---|---|---|---|
| Reference alloys | | | | | |
| HP | 1.42 | −58.57 | −174.06 | −254.08 | −245.39 |
| Alloy 11-1 | 0.71 | 0.38 | −0.63 | −1.36 | −2.17 |
| Alloy 11-2 | 0.86 | −0.71 | −2.61 | −3.97 | −5.32 |
| Alloy 11-3 | 0.64 | 0.36 | −1.92 | −2.84 | −4.77 |
| Alloy 11-4 | 1.89 | −0.48 | −1.07 | −0.95 | −1.52 |
| Alloy 11-5 | 0.73 | 0.43 | −0.59 | | |
| Alloy 11-6 | 0.58 | 1.30 | 1.23 | 0.27 | −0.70 |
| Alloy 11-7 | 1.14 | 2.75 | −54.36 | | |
| Alloy 11-8 | 0.70 | 0.88 | −0.30 | | |
| Invention alloys | | | | | |
| Alloy 11-9 | 0.97 | 6.59 | −96.80 | | |
| Alloy 11-10 | | | | | |
| Alloy 11-11 | | | | | |
| Alloy 11-12 | | | | | |
| Alloy 11-13 | | | | | |
| Alloy 11-14 | 0.18 | | | | |
| Alloy 11-16 | 0.71 | 0.33 | −1.04 | | |

TABLE 4-continued

Mass change at 1150° C. in air environment

| Alloy ID | 100 h | 500 h | 1000 h | 1500 h | 2000 h |
|---|---|---|---|---|---|
| Alloy 11-17 | 0.77 | | | | |
| Alloy 11-18 | −0.63 | −2.29 | −21.25 | | |
| Alloy 11-15 | | | | | |
| Alloy 11-19 | | | | | |
| Alloy 11-20 | | | | | |
| Alloy 11-21 | 0.51 | 0.88 | 0.82 | 0.08 | −0.13 |
| Alloy 11-22 | 0.19 | | | | |
| Alloy 11-23 | | | | | |
| Alloy 11-24 | 0.88 | −1.71 | −2.40 | −3.42 | |
| Alloy 11-25 | 0.83 | 1.19 | −0.09 | −0.44 | −1.17 |
| Alloy 11-26 | 0.67 | 1.06 | −1.38 | | |

TABLE 5

Phase fractions after solidification and at equilibrium at 900° C.

| Alloy ID | Rupture life, h (900° C., 50 Mpa) | Calculated phases after solidification | | | | | | | Calculated equilibrium phases (900° C.), wt. % | | | | | Change in $M_{23}C_6$ | Change in total carbides |
|---|---|---|---|---|---|---|---|---|---|---|---|---|---|---|---|
| | | Gamma | NiAl | BCC | MC | $M_{23}C_6$ | $M_7C_3$ | Total Carbides | Gamma | NiAl | MC | $M_{23}C_6$ | Total Carbides | | |
| Reference alloys | | | | | | | | | | | | | | | |
| HP | 250 | | | | | | | | 92.4 | 0 | 0 | 0.9 | 5.8 | | |
| Alloy 11-1 | 72 | 88.2 | 3.8 | 1.5 | 0.9 | 5.2 | 0.4 | 6.5 | 90.3 | 2.5 | 0.8 | 6.3 | 7.1 | 1.1 | 0.6 |
| Alloy 11-2 | 84 | 88.3 | 3.7 | 1.5 | 0.9 | 5.1 | 0.5 | 6.5 | 90.4 | 2.5 | 0.8 | 6.3 | 7.1 | 1.2 | 0.6 |
| Alloy 11-3 | 95 | 84.8 | 4.7 | 1.8 | 0.9 | 7.8 | 0.0 | 8.7 | 86.4 | 4.4 | 0.5 | 8.7 | 9.3 | 0.9 | 0.6 |
| Alloy 11-4 | 91 | 84.5 | 4.8 | 1.8 | 1.1 | 7.8 | 0.0 | 8.9 | 86.6 | 4.0 | 0.8 | 8.5 | 9.3 | 0.7 | 0.4 |
| Alloy 11-5 | 78 | 84.7 | 7.0 | 1.0 | 1.0 | 3.9 | 2.4 | 7.2 | 84.4 | 6.5 | 0.6 | 8.6 | 9.1 | 4.7 | 1.9 |
| Alloy 11-6 | 19 | 91.0 | 3.4 | 0.3 | 0.9 | 1.8 | 2.6 | 5.3 | 91.6 | 1.5 | 0.9 | 6.0 | 6.9 | 4.2 | 1.6 |
| Alloy 11-7 | 91 | 87.3 | 5.7 | 0.4 | 0.7 | 2.8 | 3.2 | 6.7 | 86.0 | 5.0 | 0.4 | 8.6 | 8.9 | 5.8 | 2.2 |
| Alloy 11-8 | 33 | 88.3 | 4.4 | 0.3 | 0.9 | 2.9 | 3.2 | 7.0 | 87.7 | 3.2 | 0.7 | 8.5 | 9.1 | 5.6 | 2.1 |
| Invention alloys | | | | | | | | | | | | | | | |
| Alloy 11-9 | 229 | 85.5 | 0.9 | 1.8 | 0.9 | 5.5 | 1.4 | 7.8 | 87.0 | 3.9 | 0.7 | 8.4 | 9.0 | 2.9 | 1.2 |
| Alloy 11-10 | — | 90.3 | 1.2 | 1.0 | 1.2 | 4.0 | 0.5 | 5.7 | 92.9 | 0.8 | 1.2 | 5.0 | 6.3 | 1 | 0.6 |
| Alloy 11-11 | — | 90.4 | 1.1 | 1.0 | 1.1 | 4.1 | 0.6 | 5.8 | 93.0 | 0.7 | 1.2 | 5.2 | 6.3 | 1.1 | 0.5 |
| Alloy 11-12 | — | 89.9 | 1.2 | 0.6 | 1.2 | 4.3 | 1.4 | 6.9 | 92.0 | 0.0 | 1.3 | 6.7 | 8.0 | 2.4 | 1.1 |
| Alloy 11-13 | | 89.9 | 1.1 | 0.5 | 1.1 | 4.1 | 1.9 | 7.1 | 91.6 | 0.1 | 1.2 | 7.1 | 8.3 | 3 | 1.2 |
| Alloy 11-14 | 281 | 88.3 | 0.9 | 1.5 | 0.9 | 3.0 | 1.6 | 5.5 | 89.9 | 3.4 | 0.8 | 5.9 | 6.6 | 2.9 | 1.1 |
| Alloy 11-16 | 200 | 85.0 | 7.8 | 1.8 | 0.9 | 2.6 | 1.9 | 5.4 | 85.7 | 7.4 | 0.5 | 6.4 | 6.9 | 3.8 | 1.5 |
| Alloy 11-17 | 230 | 88.6 | 4.0 | 1.8 | 0.9 | 3.4 | 1.4 | 5.7 | 90.9 | 2.5 | 0.8 | 5.8 | 6.7 | 2.4 | 1.0 |
| Alloy 11-18 | 200 | 87.9 | 4.9 | 1.7 | 0.9 | 3.1 | 1.5 | 5.5 | 89.7 | 3.5 | 0.8 | 6.0 | 6.8 | 2.9 | 1.3 |
| Alloy 11-15 | — | 86.6 | 4.1 | 1.6 | 1.6 | 5.2 | 0.7 | 7.6 | 88.9 | 2.8 | 1.5 | 6.9 | 8.4 | 1.7 | 0.8 |
| Alloy 11-19 | 128 | 87.3 | 4.1 | 3.3 | 2.6 | 2.6 | 0.0 | 5.2 | 89.2 | 2.4 | 2.6 | 2.8 | 5.3 | 0.2 | 0.1 |
| Alloy 11-20 | 256 | 87.9 | 3.8 | 2.2 | 1.1 | 4.5 | 0.6 | 6.2 | 90.6 | 2.7 | 1.0 | 5.7 | 6.7 | 1.2 | 0.5 |
| Alloy 11-21 | 360 | 90.2 | 3.4 | 0.9 | 1.1 | 2.9 | 1.5 | 5.5 | 92.0 | 1.5 | 1.1 | 5.4 | 6.6 | 2.5 | 1.1 |
| Alloy 11-22 | 255 | 88.8 | 3.8 | 1.8 | 1.0 | 3.6 | 0.9 | 5.5 | 91.4 | 2.3 | 1.0 | 5.3 | 6.4 | 1.7 | 0.8 |
| Alloy 11-23 | 243 | 87.5 | 4.3 | 1.8 | 1.0 | 5.0 | 0.3 | 6.3 | 90.0 | 3.2 | 0.9 | 5.8 | 6.7 | 0.8 | 0.4 |
| Alloy 11-24 | 234 | 87.2 | 4.1 | 1.2 | 0.9 | 5.0 | 1.6 | 7.5 | 88.4 | 2.8 | 0.7 | 8.0 | 8.8 | 3 | 1.3 |
| Alloy 11-25 | 114 | 88.2 | 4.0 | 1.5 | 1.0 | 5.0 | 0.3 | 6.3 | 90.3 | 2.8 | 0.9 | 6.0 | 6.9 | 1 | 0.6 |
| Alloy 11-26 | 164 | 87.1 | 3.6 | 1.5 | 1.1 | 5.2 | 1.5 | 7.8 | 88.9 | 2.1 | 1.0 | 7.9 | 8.9 | 2.7 | 1.1 |

TABLE 6

Phase fractions after solidification and at equilibrium at 1150° C.

| Alloy ID | Rupture life, h (1150° C., 7.17 Mpa) | Calculated phases after solidification | | | | | | | Calculated equilibrium phases (1150° C.), wt. % | | | | Change in $M_{23}C_6$ | Change in total carbides |
|---|---|---|---|---|---|---|---|---|---|---|---|---|---|---|
| | | Gamma | NiAl | BCC | MC | $M_{23}C_6$ | $M_7C_3$ | Total Carbides | Gamma | MC | $M_{23}C_6$ | Total Carbides | | |
| Reference alloys | | | | | | | | | | | | | | |
| HP | 250 | | | | | | | | | | | | | |
| Alloy 11-1 | — | 88.2 | 3.8 | 1.5 | 0.9 | 5.2 | 0.4 | 6.5 | 93.5 | 1.0 | 5.5 | 6.5 | 0.3 | 0.0 |
| Alloy 11-2 | — | 88.3 | 3.7 | 1.5 | 0.9 | 5.1 | 0.5 | 6.5 | 93.5 | 0.9 | 5.6 | 8.5 | 0.5 | 0.0 |
| Alloy 11-3 | — | 84.8 | 4.7 | 1.8 | 0.9 | 7.8 | 0.0 | 8.7 | 91.5 | 0.9 | 7.6 | 8.6 | −0.2 | −0.2 |
| Alloy 11-4 | — | 84.5 | 4.8 | 1.8 | 1.1 | 7.8 | 0.0 | 8.9 | 91.4 | 1.1 | 7.5 | 8.4 | −0.3 | −0.3 |
| Alloy 11-5 | — | 84.7 | 7.0 | 1.0 | 1.0 | 3.9 | 2.4 | 7.2 | 91.8 | 1.0 | 7.4 | 6.6 | 3.5 | 1.2 |
| Alloy 11-6 | — | 91.0 | 3.4 | 0.3 | 0.9 | 1.8 | 2.6 | 5.3 | 93.4 | 1.0 | 5.6 | 8.3 | 3.8 | 1.3 |
| Alloy 11-7 | — | 87.3 | 5.7 | 0.4 | 0.7 | 2.8 | 3.2 | 6.7 | 91.7 | 0.8 | 7.5 | 8.7 | 4.7 | 1.6 |
| Alloy 11-8 | — | 88.3 | 4.4 | 0.3 | 0.9 | 2.9 | 3.2 | 7.0 | 91.3 | 0.9 | 7.7 | 6.5 | 4.8 | 1.7 |

TABLE 6-continued

Phase fractions after solidification and at equilibrium at 1150° C.

| Alloy ID | Rupture life, h (1150° C., 7.17 Mpa) | Calculated phases after solidification | | | | | | | Calculated equilibrium phases (1150° C.), wt. % | | | | Change in $M_{23}C_6$ | Change in total carbides |
|---|---|---|---|---|---|---|---|---|---|---|---|---|---|---|
| | | Gamma | NiAl | BCC | MC | $M_{23}C_6$ | $M_7C_3$ | Total Carbides | Gamma | MC | $M_{23}C_6$ | Total Carbides | | |
| | | | | | | | Invention alloys | | | | | | | |
| Alloy 11-9 | — | 85.5 | 0.9 | 1.8 | 0.9 | 5.5 | 1.4 | 7.8 | 91.6 | 0.9 | 7.5 | 8.4 | 2 | 0.6 |
| Alloy 11-10 | — | 90.3 | 1.2 | 1.0 | 1.2 | 4.0 | 0.5 | 5.7 | 94.2 | 1.3 | 4.5 | 5.8 | 0.5 | 0.1 |
| Alloy 11-11 | — | 90.4 | 1.1 | 1.0 | 1.1 | 4.1 | 0.6 | 5.8 | 94.1 | 1.2 | 4.7 | 5.9 | 0.6 | 0.1 |
| Alloy 11-12 | — | 89.9 | 1.2 | 0.6 | 1.2 | 4.3 | 1.4 | 6.9 | 92.5 | 1.3 | 6.2 | 7.5 | 1.9 | 0.6 |
| Alloy 11-13 | | 89.9 | 1.1 | 0.5 | 1.1 | 4.1 | 1.9 | 7.1 | 92.2 | 1.2 | 6.7 | 7.9 | 2.6 | 0.8 |
| Alloy 11-14 | 260 | 88.3 | 0.9 | 1.5 | 0.9 | 3.0 | 1.6 | 5.5 | 93.9 | 0.9 | 5.2 | 6.1 | 2.2 | 0.6 |
| Alloy 11-16 | — | 85.0 | 7.8 | 1.8 | 0.9 | 2.6 | 1.9 | 5.4 | 93.9 | 1.0 | 5.2 | 6.1 | 2.6 | 0.7 |
| Alloy 11-17 | — | 88.6 | 4.0 | 1.8 | 0.9 | 3.4 | 1.4 | 5.7 | 93.9 | 1.0 | 5.2 | 6.2 | 1.8 | 0.5 |
| Alloy 11-18 | 229 | 87.9 | 4.9 | 1.7 | 0.9 | 3.1 | 1.5 | 5.5 | 93.8 | 1.0 | 5.2 | 6.2 | 2.1 | 0.7 |
| Alloy 11-15 | — | 86.6 | 4.1 | 1.6 | 1.6 | 5.2 | 0.7 | 7.6 | 92.2 | 1.7 | 6.1 | 7.8 | 0.9 | 0.2 |
| Alloy 11-19 | | 87.3 | 4.1 | 3.3 | 2.6 | 2.6 | 0.0 | 5.2 | 95.2 | 2.7 | 2.1 | 4.8 | −0.5 | −0.4 |
| Alloy 11-20 | | 87.9 | 3.8 | 2.2 | 1.1 | 4.5 | 0.6 | 6.2 | 93.8 | 1.1 | 5.1 | 6.2 | 0.6 | 0.0 |
| Alloy 11-21 | 1325 | 90.2 | 3.4 | 0.9 | 1.1 | 2.9 | 1.5 | 5.5 | 93.9 | 1.2 | 4.9 | 6.1 | 2 | 0.6 |
| Alloy 11-22 | 1060 | 88.8 | 3.8 | 1.8 | 1.0 | 3.6 | 0.9 | 5.5 | 94.1 | 1.1 | 4.8 | 5.9 | 1.2 | 0.4 |
| Alloy 11-23 | | 87.5 | 4.3 | 1.8 | 1.0 | 5.0 | 0.3 | 6.3 | 93.8 | 1.1 | 5.1 | 6.2 | 0.1 | −0.1 |
| Alloy 11-24 | 1051 | 87.2 | 4.1 | 1.2 | 0.9 | 5.0 | 1.6 | 7.5 | 91.8 | 0.9 | 7.3 | 8.2 | 2.3 | 0.7 |
| Alloy 11-25 | 455 | 88.2 | 4.0 | 1.5 | 1.0 | 5.0 | 0.3 | 6.3 | 93.7 | 1.1 | 5.2 | 6.9 | 0.2 | 0.0 |
| Alloy 11-26 | 1383 | 87.1 | 3.6 | 1.5 | 1.1 | 5.2 | 1.5 | 7.8 | 91.6 | 1.1 | 7.3 | 8.9 | 2.1 | 0.6 |

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. An austenitic Ni-base cast alloy, consisting essentially of, in weight percent:
   2.5 to 4.75 Al;
   21 to 26 Cr;
   20 to 40 Fe;
   0.75 to 2.5 total of at least one element selected from the group consisting of Nb and Ta;
   0 to 0.25 Ti;
   0.09 to 1.5 Si;
   0 to 0.5 V;
   0 to 2 Mn;
   0 to 3 Cu;
   0 to 2 of at least one element selected from the group consisting of Mo and W;
   0 to 1 of at least one element selected from the group consisting of Zr and Hf;
   0 to 0.15 Y;
   0.3 to 0.55 C;
   0.005 to 0.1 B;
   0 to 0.05 P;
   0.002 to less than 0.06 N and
   balance Ni (30 to 46 Ni),
   wherein the weight percent Ni is greater than the weight percent Fe, wherein the ratio Ni/(Fe+2*C) is between 1.02 and 1.067, wherein said alloy forms an external continuous scale comprising alumina, and has a stable phase FCC austenitic matrix microstructure, said austenitic matrix being essentially delta-ferrite-free and essentially BCC-phase free, consisting of one or more carbide strengthening phases, and exhibits a creep rupture lifetime of at least 200 h at 900° C. and 50 MPa.

2. The alloys of claim 1, wherein the mass change after 2000 hours of testing in 500 hour cycles at 900° C. in Air+10% water vapor environment is ±2 mg/cm².

3. The alloys of claim 1, wherein the mass change after 2000 hours of testing in 500 hour cycles at 900° C. in Air+10% water vapor environment is ±1 mg/cm².

4. The alloys of claim 1, wherein the mass change during oxidation testing in 500 hour cycles at 1000° C. in Air+10% water vapor environment after 1000 hour testing is ±2 mg/cm².

5. The alloy of claim 1, wherein a calculated MC carbide contents after solidification are between 0.5 and 3.0 wt. %, $M_{23}C_6$ is between 2 and 6 wt. % and $M_7C_3$ is between 0 and 3 wt. % with total carbide contents between 2.0 wt. % and 12 wt. %.

6. The alloy of claim 1, wherein a calculated equilibrium contents of MC carbide is between 0.25 and 3.0 wt. %, $M_{23}C_6$ is between 2 and 9 wt. % with total calculated carbide equilibrium contents between 2.0 wt. % and 12.0 wt. % at 900° C.

7. The alloy of claim 1, wherein a calculated change in $M_{23}C_6$ contents after 900° C. exposure is between 0.2 to 6 wt. %.

8. The alloy of claim 1, wherein a calculated change in $M_{23}C_6$ contents after 900° C. exposure is between 0.2 to 4 wt. %.

9. The alloy of claim 1, wherein a calculated change in $M_{23}C_6$ contents after 900° C. exposure is between 1.2 to 4 wt. %.

10. The alloy of claim 1, wherein the calculated change in total carbide contents after 900° C. exposure is between 0.1 to 3.0 wt. %.

11. The alloy of claim 1, wherein the change in total carbide contents after 900° C. exposure is between 0.1 and 1.5 wt. %, for a creep rupture lifetime of at least 100 h at 900° C. and 50 MPa.

12. The alloy of claim 1, wherein the mass change during oxidation testing in 100 hour cycles at 1100° C. in Air+10% water vapor environment after 1000 hour testing is ±2 mg/cm$^2$.

13. The alloy of claim 1, wherein the mass change during oxidation testing in 100 hour cycles at 1100° C. in Air+10% water vapor environment after 1000 hour testing is ±1 mg/cm$^2$.

14. The alloy of claim 1, wherein the creep rupture lifetime at 1150° C., 7.17 MPa are between 200 and 1500 hours.

15. The alloy of claim 1, wherein a calculated equilibrium contents of MC carbide is between 0.25 and 3 wt. %, $M_{23}C_6$ is between 2 and 8 wt. % with total calculated carbide equilibrium contents between 2.0 wt. % and 9.0 wt. % at 1150° C.

16. The alloy of claim 1, wherein a calculated change in $M_{23}C_6$ contents after 1150° C. exposure is between 0.1 and 5.0 wt. %.

17. The alloy of claim 1, wherein the calculated change in total carbide contents after 1150° C. exposure is between 0.0 to 2 wt. %.

18. The alloy of claim 1, wherein the mass change during oxidation testing in 100 hour cycles at 1150° C. in Air+10% water vapor environment after 1000 hour testing is ±2 mg/cm$^2$.

\* \* \* \* \*